US012761473B2

(12) United States Patent
Kitahara et al.

(10) Patent No.: US 12,761,473 B2
(45) Date of Patent: Oct. 13, 2026

(54) LIGHT SOURCE UNIT AND IMAGE DISPLAY DEVICE

(71) Applicant: NICHIA CORPORATION, Anan (JP)

(72) Inventors: Wataru Kitahara, Kamiina-gun (JP); Naoki Nakamura, Suwa-gun (JP); Takanori Aruga, Suwa-gun (JP); Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 141 days.

(21) Appl. No.: 18/390,954

(22) Filed: Dec. 20, 2023

(65) Prior Publication Data

US 2024/0210680 A1 Jun. 27, 2024

(30) Foreign Application Priority Data

Dec. 26, 2022 (JP) ................................ 2022-208937

(51) Int. Cl.
*G02B 27/01* (2006.01)

(52) U.S. Cl.
CPC .. *G02B 27/0101* (2013.01); *G02B 2027/0112* (2013.01); *G02B 2027/0154* (2013.01); *G02B 2207/123* (2013.01)

(58) Field of Classification Search
None
See application file for complete search history.

(56) References Cited

U.S. PATENT DOCUMENTS 5,729,242 A * 3/1998 Margerum ......... G02B 27/0101 349/5
5,764,407 A 6/1998 Nanba
10,606,075 B2 3/2020 Choi et al.
11,169,377 B1 11/2021 Chen
11,287,649 B2 3/2022 Hong
2003/0035232 A1 2/2003 Sasaki
(Continued)

FOREIGN PATENT DOCUMENTS

JP H03-273943 A 12/1991
JP H06-347708 A 12/1994
(Continued)

OTHER PUBLICATIONS

Non-Final Office Action in U.S. Appl. No. 18/538,112 dated Nov. 5, 2024.

(Continued)

*Primary Examiner* — Shan Liu
(74) *Attorney, Agent, or Firm* — Foley & Lardner LLP

(57) ABSTRACT

A light source unit includes a display device and an imaging optical system; the display device includes a pixel column including multiple pixels arranged along a first direction; the imaging optical system includes a movable optical system and an output element; light emitted from the display device is incident on the movable optical system; the movable optical system is movable around an axis parallel to the first direction and emits light at an angle corresponding to a movement state; light is incident on the output element via the movable optical system; and the light emitted from the output element forms a first image. The imaging optical system is substantially telecentric at the first image side; and the light emitted from the display device has a substantially Lambertian light distribution.

20 Claims, 11 Drawing Sheets

(56) References Cited

U.S. PATENT DOCUMENTS

| | | | |
|---|---|---|---|
| 2003/0107716 A1 | 6/2003 | Ogawa | |
| 2004/0145814 A1 | 7/2004 | Rogers | |
| 2005/0007593 A1 | 1/2005 | Lebens | |
| 2005/0052617 A1 | 3/2005 | Fujikawa et al. | |
| 2007/0024977 A1 | 2/2007 | Kawamura et al. | |
| 2007/0146242 A1 | 6/2007 | Miller et al. | |
| 2008/0316606 A1 | 12/2008 | Inoguchi et al. | |
| 2009/0040588 A1 | 2/2009 | Tonar et al. | |
| 2009/0167989 A1* | 7/2009 | Ito | G02B 6/0073 349/65 |
| 2010/0109977 A1 | 5/2010 | Yamazaki et al. | |
| 2010/0271396 A1 | 10/2010 | Nemeth et al. | |
| 2011/0164311 A1 | 7/2011 | Morikuni | |
| 2012/0020092 A1* | 1/2012 | Bailey | F21K 9/61 313/483 |
| 2015/0253469 A1 | 9/2015 | Le Gros et al. | |
| 2015/0378104 A1 | 12/2015 | Takahashi | |
| 2017/0146803 A1 | 5/2017 | Kishigami et al. | |
| 2017/0146809 A1* | 5/2017 | Furuya | G03B 21/28 |
| 2018/0024335 A1 | 1/2018 | Uehara | |
| 2018/0039077 A1 | 2/2018 | Kuzuhara et al. | |
| 2018/0352204 A1 | 12/2018 | Fujita | |
| 2018/0358339 A1 | 12/2018 | Iguchi | |
| 2019/0011712 A1 | 1/2019 | Nagano et al. | |
| 2019/0049725 A1 | 2/2019 | Kondo et al. | |
| 2019/0061525 A1 | 2/2019 | Ji | |
| 2019/0061638 A1 | 2/2019 | Hisatsugu et al. | |
| 2019/0071014 A1 | 3/2019 | Misu | |
| 2019/0072764 A1 | 3/2019 | Lee et al. | |
| 2019/0072799 A1 | 3/2019 | Narushima | |
| 2019/0073828 A1 | 3/2019 | Oiwa | |
| 2019/0235240 A1 | 8/2019 | Nagano et al. | |
| 2020/0050005 A1* | 2/2020 | Kojima | G02B 3/08 |
| 2020/0201036 A1 | 6/2020 | Hong | |
| 2020/0271927 A1 | 8/2020 | Kawana | |
| 2020/0319456 A1 | 10/2020 | Yatsu et al. | |
| 2020/0333608 A1 | 10/2020 | Katagiri et al. | |
| 2021/0239989 A1 | 8/2021 | Ide et al. | |
| 2021/0325700 A1 | 10/2021 | Chen | |
| 2021/0373331 A1 | 12/2021 | Gu et al. | |
| 2021/0382304 A1 | 12/2021 | You et al. | |
| 2022/0035165 A1 | 2/2022 | Takeda et al. | |
| 2022/0046212 A1* | 2/2022 | Xu | H04N 9/3138 |
| 2022/0138916 A1 | 5/2022 | Takagi et al. | |
| 2022/0350139 A1* | 11/2022 | Tsuda | G01C 21/365 |
| 2022/0365266 A1 | 11/2022 | Cheng et al. | |
| 2022/0365345 A1 | 11/2022 | Hamada | |
| 2023/0026137 A1 | 1/2023 | Kusafuka et al. | |
| 2023/0034288 A1 | 2/2023 | Hong et al. | |
| 2023/0118416 A1 | 4/2023 | Hirata et al. | |
| 2023/0206795 A1 | 6/2023 | Lyou et al. | |
| 2023/0207606 A1 | 6/2023 | Mezouari et al. | |
| 2023/0415576 A1 | 12/2023 | Zozgornik | |
| 2024/0061240 A1 | 2/2024 | Hirata et al. | |
| 2024/0210684 A1 | 6/2024 | Kitahara et al. | |
| 2024/0241421 A1 | 7/2024 | Marchewka et al. | |

FOREIGN PATENT DOCUMENTS

| | | | | |
|---|---|---|---|---|
| JP | H07-140918 | A | 6/1995 | |
| JP | H07-306377 | A | 11/1995 | |
| JP | H09-200651 | A | 7/1997 | |
| JP | H10-274740 | A | 10/1998 | |
| JP | 2003-005073 | A | 1/2003 | |
| JP | 2003-043360 | A | 2/2003 | |
| JP | 2003-177320 | A | 6/2003 | |
| JP | 2004-045718 | A | 2/2004 | |
| JP | 2004-527801 | A | 9/2004 | |
| JP | 2005-070255 | A | 3/2005 | |
| JP | 2009-003128 | A | 1/2009 | |
| JP | 2009-251194 | A | 10/2009 | |
| JP | 2010-107873 | A | 5/2010 | |
| JP | 2011-138086 | A | 7/2011 | |
| JP | 2013-183042 | A | 9/2013 | |
| JP | 2016-033867 | A | 3/2016 | |
| JP | 2016-102810 | A | 6/2016 | |
| JP | 2016-148829 | A | 8/2016 | |
| JP | 2017-037304 | A | 2/2017 | |
| JP | 2017-049371 | A | 3/2017 | |
| JP | 2019-073272 | A | 5/2019 | |
| JP | 2019-095690 | A | 6/2019 | |
| JP | 2020-012986 | A | 1/2020 | |
| JP | 2020-074005 | A | 5/2020 | |
| JP | 2020-144184 | A | 9/2020 | |
| JP | 6809441 | B2 | 1/2021 | |
| JP | 2021-124527 | A | 8/2021 | |
| JP | 2021-162801 | A | 10/2021 | |
| JP | 2021-529332 | A | 10/2021 | |
| JP | 2022-025889 | A | 2/2022 | |
| JP | 2022-073094 | A | 5/2022 | |
| JP | 2022-129223 | A | 9/2022 | |
| WO | WO-2014207457 | A1 * | 12/2014 | H04N 9/3132 |
| WO | WO-2015/190157 | A1 | 12/2015 | |
| WO | WO-2016/103418 | A1 | 6/2016 | |
| WO | WO-2016208195 | A1 * | 12/2016 | G02B 27/01 |
| WO | WO-2017/138242 | A1 | 8/2017 | |
| WO | WO-2017/154360 | A1 | 9/2017 | |
| WO | WO-2017/170702 | A1 | 10/2017 | |
| WO | WO-2019/008684 | A1 | 1/2019 | |
| WO | WO-2019/130860 | A1 | 7/2019 | |
| WO | WO-2019/130944 | A1 | 7/2019 | |
| WO | WO-2021/054277 | A1 | 3/2021 | |
| WO | WO-2021/065820 | A1 | 4/2021 | |
| WO | WO-2021/106689 | A1 | 6/2021 | |

OTHER PUBLICATIONS

U.S. Appl. No. 18/496,594, filed Oct. 27, 2023, Kitahara et al.
U.S. Appl. No. 18/511,505, filed Nov. 16, 2023, Kitahara et al.
U.S. Appl. No. 18/513,895, filed Nov. 20, 2023, Kitahara et al.
U.S. Appl. No. 18/538,112, filed Dec. 13, 2023, Aruga et al.
U.S. Appl. No. 18/543,762, filed Dec. 18, 2023, Kitahara et al.
Final Office Action in U.S. Appl. No. 18/538,112 dated Jul. 22, 2025.
Non-Final Office Action in U.S. Appl. No. 18/538,112 dated Mar. 19, 2025.
Notice of Allowance in U.S. Appl. No. 18/513,895 Dtd Aug. 6, 2024.
Non-Final Office Action in U.S. Appl. No. 18/496,594 Dtd Jul. 11, 2024.
U.S. Appl. No. 18/390,954, filed Dec. 20, 2023, Kitahara et al.
U.S. Appl. No. 18/691,498, filed Mar. 13, 2024, Kitahara et al.
U.S. Appl. No. 18/867,745, filed Nov. 20, 2024, Kitahara et al.
U.S. Appl. No. 18/870,981, filed Dec. 2, 2024, Kitahara et al.
U.S. Appl. No. 18/956,890, filed Nov. 22, 2024, Kitahara et al.
Notice of Allowance in U.S. Appl. No. 18/496,594 dated Dec. 4, 2024.
Non-Final Office Action in U.S. Appl. No. 18/691,498 dated Jan. 23, 2026.
Non-Final Office Action in U.S. Appl. No. 18/511,505 dated Feb. 13, 2026.
Office Action issued in Korean Appl. No. 10-2024-7008308 dated Apr. 9, 2026.
Notice of Allowance in U.S. Appl. No. 18/511,505 dated May 14, 2026.
Notice of Allowance in U.S. Appl. No. 18/543,762 dated Jun. 16, 2026.
Notice of Allowance in U.S. Appl. No. 18/956,890 dated Jul. 2, 2026.
Non-Final Office Action in U.S. Appl. No. 18/867,745 dated Aug. 3, 2026.
Non-Final Office Action in U.S. Appl. No. 18/870,981 dated Aug. 10, 2026.
Notice of Allowance in U.S. Appl. No. 18/978,166 dated Aug. 14, 2026.
Notice of Reasons for Refusal issued in Japanese Appl. No. 2022-182313 dated Sep. 2, 2026.

(56) References Cited

OTHER PUBLICATIONS

Notice of Reasons for Refusal issued in Japanese Appl. No. 2024-5524176 dated Aug. 26, 2026.
Notice of Reasons for Refusal issued in Japanese Appl. No. 2024-526238 dated Aug. 26, 2026.

* cited by examiner

LIGHT SOURCE UNIT AND IMAGE DISPLAY DEVICE

CROSS-REFERENCE TO RELATED APPLICATIONS

This application is based upon and claims priority to Japanese Patent Application No. 2022-208937, filed on Dec. 26, 2022 the entire contents of which are incorporated herein by reference.

FIELD

Embodiments described herein relate generally to a light source unit and an image display device.

BACKGROUND

In known art, light emitted from a display device configured to display an image is sequentially reflected by multiple mirrors, and the light reflected by the final mirror is further reflected toward a user by a reflecting member such as a windshield or the like, so that the user views a virtual image corresponding to the image displayed by the display device (see, e.g., PCT Publication No. WO2016/208195).

SUMMARY

An embodiment of the invention is directed to a light source unit and an image display device that are small and can display a high-quality image.

A light source unit according to an embodiment of the invention includes a display device and an imaging optical system; the display device includes a pixel column including multiple pixels arranged along a first direction; the imaging optical system includes a movable optical system and an output element; light emitted from the display device is incident on the movable optical system; the movable optical system is movable around an axis parallel to the first direction; the movable optical system emits light at an angle corresponding to a movement state; light is incident on the output element via the movable optical system; and the light emitted from the output element forms a first image. The imaging optical system is substantially telecentric at the first image side; and the light emitted from the display device has a substantially Lambertian light distribution.

DETAILED DESCRIPTION

Figure 1:
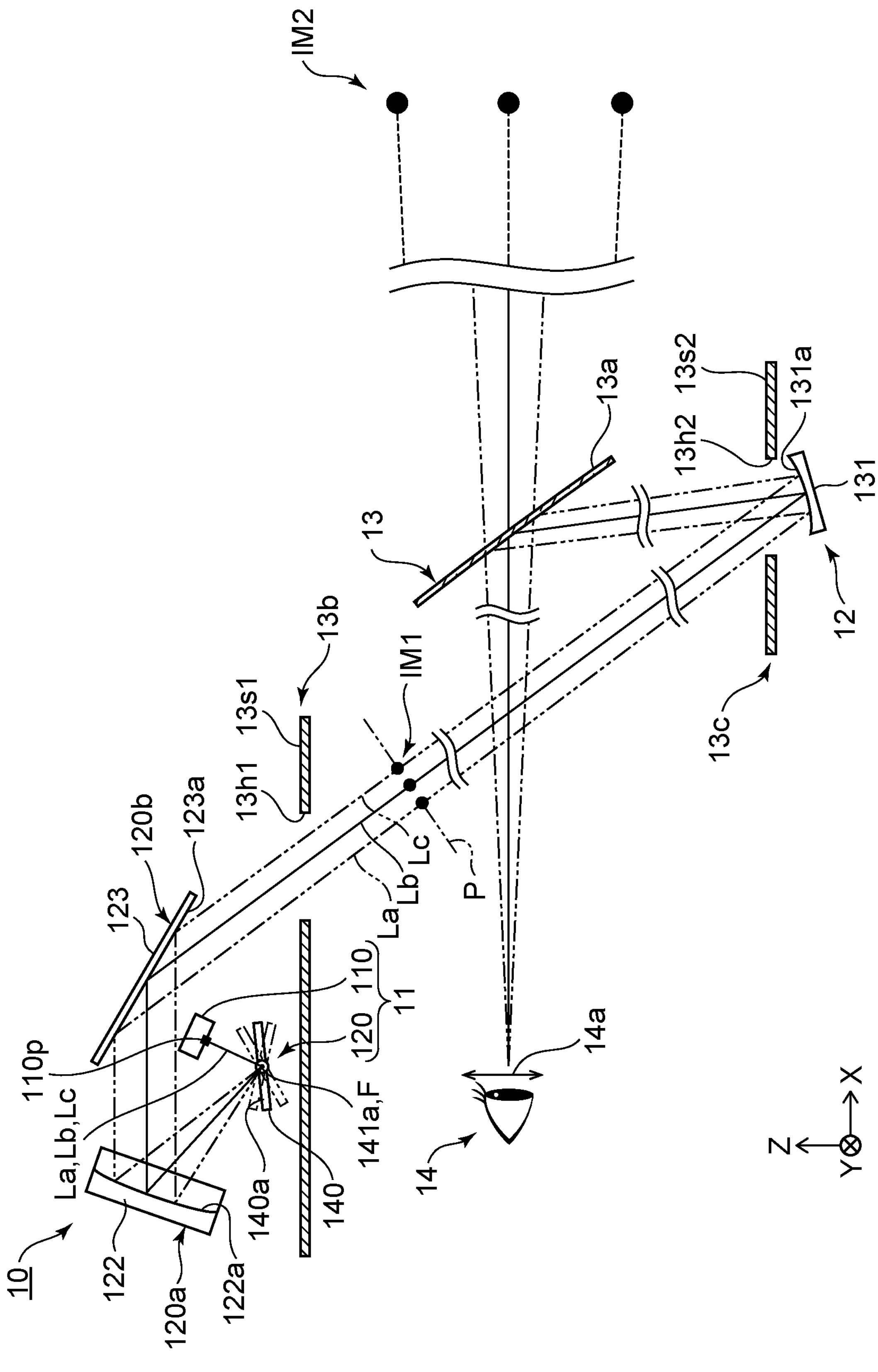
FIG. 1 is a schematic cross-sectional view showing a head-up display in which an image display device according to a first embodiment is applied.

Exemplary embodiments will now be described with reference to the drawings. The drawings are schematic or conceptual, and the relationships between the thickness and width of portions, the proportional coefficients of sizes among portions, etc., are not necessarily the same as the actual values thereof. Furthermore, the dimensions and proportions may be illustrated differently among drawings, even for identical portions. In the specification of the application and the drawings, components similar to those described in regard to a previous drawing are marked with like reference numerals, and a detailed description is omitted as appropriate.

First Embodiment

FIG. 1 is a cross-sectional view showing a head-up display in which an image display device according to a first embodiment is applied.

As shown in FIG. 1, the image display device 10 according to the embodiment includes the light source unit 11 and a reflection unit 12. In FIG. 1, the image display device 10 is partially enlarged to more clearly show the configurations of the light source unit 11 and the reflection unit 12. This is similar for the illustration of an image display device 20 according to a second embodiment described below with reference to FIG. 7 and for an image display device 70B according to a third embodiment described below with reference to FIG. 10.

The light source unit 11 forms a first image IM1. The first image IM1 is a first image corresponding to an image set in a display controller 1410 described below with reference to FIG. 2. The reflection unit 12 is arranged to be separated from the light source unit 11. The reflection unit 12 is arranged to reflect the light emitted by the light source unit 11. The first image IM1 is formed at a formation position P between the light source unit 11 and the reflection unit 12. The first image IM1 is an intermediate image and is a real image. The first image IM1 and the image in the display controller 1410 have substantially similar shapes. In the drawings, the position at which the first image IM1 is formed is shown by circular marks for easier understanding of the description. The formation position P of the first image refers to the position of a planar projection plane at which the first image is formed, wherein chief rays of the light emitted from the light source unit 11 are substantially parallel at the position of the projection plane, and the projection plane is arranged to be substantially orthogonal to the chief rays. According to the embodiment, the formation position P of the first image is at any position between the light source unit 11 and the reflection unit 12.

For example, the image display device 10 is mounted in a vehicle 13 such as an automobile or the like and is applied to a HUD (Head Up Display). Specifically, a user 14 that is a driver or the like of the vehicle 13 is seated at a position facing a front windshield 13*a*. The greater part of the light reflected by the reflection unit 12 is reflected by the inner surface of the front windshield 13*a* and enters an eyebox 14*a* of the user 14. In other words, the inner surface of the front windshield 13*a* of the vehicle 13 functions as a reflecting surface. Instead of the front windshield 13*a*, a combiner that includes a surface facing the user 14 may be used as the reflecting surface. Thus, the user 14 can view a second image IM2 corresponding to the first image IM1 formed by the light source unit 11. The second image IM2 is a virtual image that is larger than the first image IM1. The second image IM2 and the image set in the display controller 1410 have substantially similar shapes. In the drawings, the position at which the second image IM2 is formed is shown by circular marks.

In the description of the image display device 10, an XYZ orthogonal coordinate system may be used for easier understanding of the description. Hereinbelow, the direction in which an X-axis extends is called an "X-direction," the direction in which a Y-axis extends is called a "Y-direction," and the direction in which a Z-axis extends is called a "Z-direction." According to the embodiment, an example is described in which the longitudinal direction of the vehicle 13 is along the "X-direction," the lateral direction of the vehicle 13 is along the "Y-direction," and the vertical direction of the vehicle 13 is along the "Z-direction." In other words, in the following examples, the XY-plane is the horizontal plane of the vehicle 13.

Hereinbelow, the X-direction in the direction of the arrow also is called the "+X direction," and the opposite direction also is called the "−X direction." The Y-direction in the direction of the arrow also is called the "+Y direction," and the opposite direction also is called the "−Y direction." The Z-direction in the direction of the arrow also is called the "+Z direction," and the opposite direction also is called the "−Z direction." A member A and a member B being arranged in this order in the +X direction is referred to as "the member B being positioned at the +X side of the member A" or "the member A being positioned at the −X side of the member B." This is similar for the +Y direction and the +Z direction as well. The XYZ orthogonal coordinate system also may be used in the descriptions of an image display device 20 according to a second embodiment and an image display device 70B according to a fourth embodiment described below.

The light source unit 11 will now be described.

The light source unit 11 includes a display device 110 and an imaging optical system 120. The display device 110 emits light having a substantially Lambertian light distribution to the imaging optical system 120. The light that is incident on the imaging optical system 120 is emitted by the imaging optical system 120 to be light that is substantially telecentric at the first image IM1 side. Light that has a substantially Lambertian light distribution and light that is substantially telecentric are described below.

The display device 110 includes multiple pixels 110*p*. The multiple pixels 110*p* are arranged in one column in one direction. In the example of FIG. 1, the pixels 110*p* are arranged along the Y-axis direction.

The imaging optical system 120 includes a movable optical system 140 and an output element 123. In the example of FIG. 1, the movable optical system 140 is a galvano mirror. The movable optical system 140, which is a galvano mirror, includes a mirror surface (a reflective mirror) 140*a* on at least one surface. The movable optical system 140 is arranged to face the multiple pixels 110*p* of the display device 110. The output element 123 is arranged to reflect the light emitted from the movable optical system 140. The light is incident via the movable optical system 140 to the output element 123. The light emitted from the output element 123 forms the first image IM1.

The light that is emitted from the display device 110 is reflected by the mirror surface 140*a* of the movable optical system 140 and emitted toward the output element 123. The output element 123 includes a mirror surface 123*a* at one surface. The light that is incident from the movable optical system 140 is reflected by the mirror surface 123*a* of the output element 123 and emitted toward the reflection unit 12.

The movable optical system 140 is movable around an axis 141*a*. In the example of FIG. 1, the axis 141*a* is arranged to be parallel to the Y-axis direction. The Y-axis direction is parallel to an α-axis as described with reference to FIG. 5A. The light that is emitted by the pixel 110*p* of the display device 110 is incident on the mirror surface 140*a* of the movable optical system 140 and is reflected by the mirror surface 140*a* at an angle corresponding to the movement state of the movable optical system 140.

To avoid complexity of illustration, FIG. 1 illustrates chief rays La to Lc of light emitted by one pixel 110*p* and reflected and transmitted by the optical system. The pixel 110*p* of the display device 110 sequentially emits light corresponding to the passage of time. For example, the display device 110 emits the light at a constant cycle according to the passage of time. FIG. 1 shows the chief rays La, Lb, and Lc corresponding to light sequentially emitted at a constant cycle.

The movable optical system 140 is movable according to the passage of time. Specifically, for example, the movable optical system 140 rotates at a constant speed around the axis 141*a*. Therefore, light is incident on the movable optical system 140 and reflected by the movable optical system 140 at angles corresponding to the time. That is, light that corresponds to the chief ray La is incident on the movable optical system 140 and reflected by the movable optical system 140 at the angle at the time at which the display device 110 emits light corresponding to the chief ray La. Light that corresponds to the chief ray Lb is incident on the movable optical system 140 and reflected by the movable optical system 140 at the angle at the time at which the display device 110 emits light corresponding to the chief ray Lb. Light that corresponds to the chief ray Lc is incident on the movable optical system 140 and reflected by the movable optical system 140 at the angle at the time at which the display device 110 emits light corresponding to the chief ray Lc. By appropriately setting the cycle length of the light emitted by the display device 110 and the rotational speed of the movable optical system 140, the display device 110 and the movable optical system 140 sequentially emit the light toward the output element 123 to form one image.

As shown in FIG. 1, the imaging optical system 120 is substantially telecentric at the first image IM1 side, and the movable optical system 140 is arranged so that the chief rays La to Lc cross. That is, the movable optical system 140 is located at the vicinity of a focal point F of the imaging optical system 120 when viewed from the first image IM1.

"The imaging optical system 120 is substantially telecentric at the first image IM1 side" means that the chief rays La to Lc that are emitted from mutually-different positions of the display device 110, travel via the imaging optical system 120, and reach the first image IM1 are substantially parallel before and after the first image IM1 as shown in FIG. 1. The different positions are positions at the formation position P of the reflected light being formed by the light emitted from the display device 110 at each time and emitted by the movable optical system 140 at the angle at each time. "The chief rays La to Lc being substantially parallel" means substantially parallel in a practical range permitting errors due to the manufacturing accuracy, assembly accuracy, etc., of the components of the light source unit 11. "The multiple chief rays La to Lc being substantially parallel to each other" means that, for example, the angles respectively between the chief rays La to Lc each are not more than 10°.

For example, optical simulation or the like can be used to design the position of the focal point F of the imaging optical system 120 and determine whether or not the imaging optical system 120 is substantially telecentric at the first image IM1 side.

An operation of the movable optical system 140 will now be described.

Figure 2:
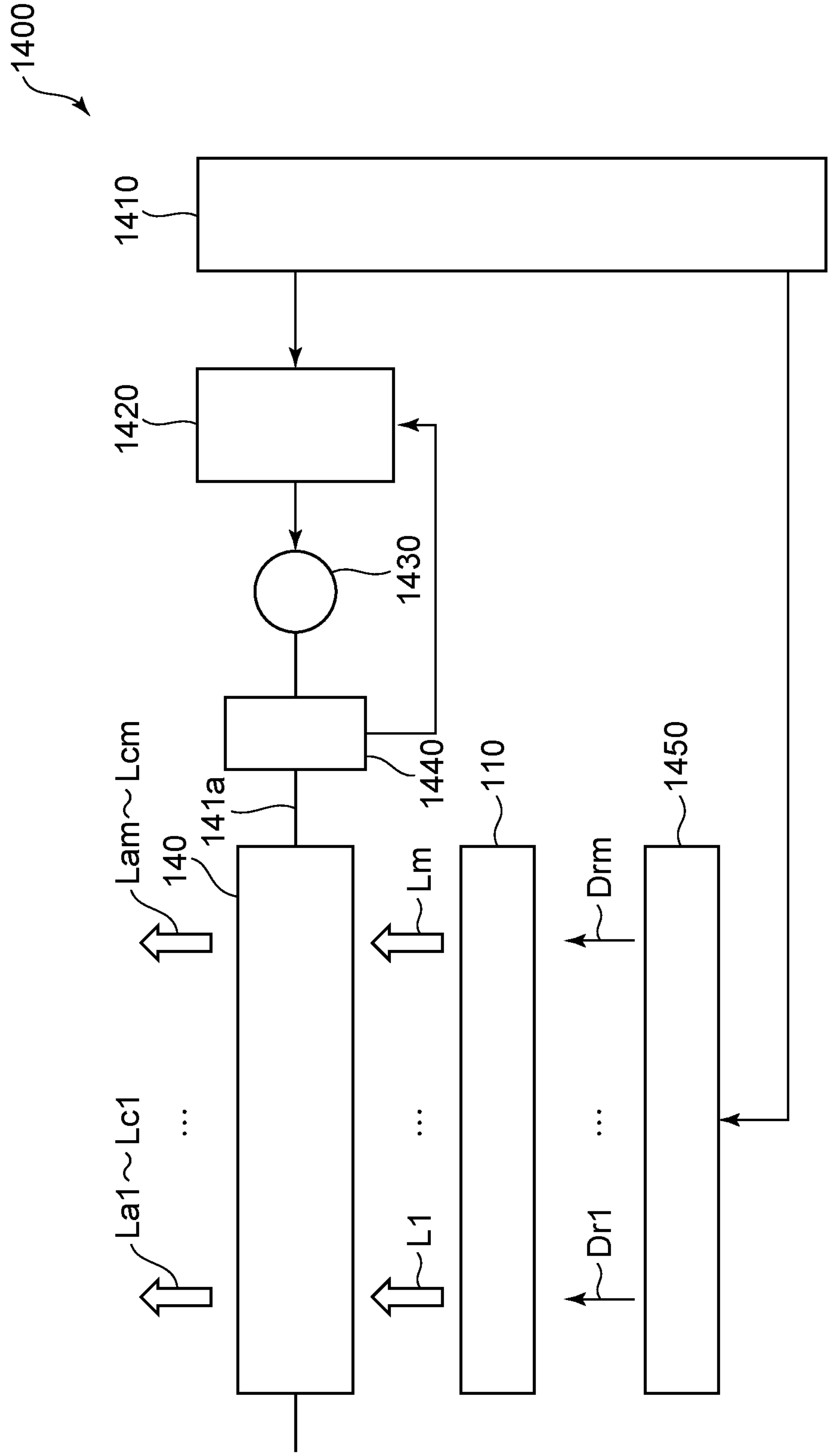
FIG. 2 is a schematic block diagram for describing an operation of a movable optical system of the image display device according to the first embodiment.

FIG. 2 is a schematic block diagram for describing an operation of the display device of the image display device according to the first embodiment.

FIG. 2 shows a configuration example in which light that is emitted from the display device 110 including multiple pixels arranged in one column is emitted toward a rotating movable optical system 140, and the movable optical system 140 emits the light corresponding to the angle.

As shown in FIG. 2, a display control system 1400 includes the display controller 1410, a scanning circuit 1420, a motor 1430, an angle sensor 1440, and a driver 1450. The display controller 1410 is electrically connected to the scanning circuit 1420 and the driver 1450. The scanning circuit 1420 is electrically connected to the motor 1430. The angle sensor 1440 is provided to detect the angle of the axis **141*a* of the movable optical system 140. The angle sensor 1440 is electrically connected to the scanning circuit 1420**.

The driver 1450 is electrically connected to the display device 110. For example, the driver 1450 is connected to output, to the display device 110, multiple drive signals Dr1 to Drm to drive the m pixels of the display device 110.

Data related to the image to be displayed by the light source unit 11 shown in FIG. 1 is preset in the display controller 1410. Based on the preset data related to the image, the display controller 1410 generates a scanning signal and a drive signal and outputs the scanning signal and the drive signal respectively to the scanning circuit 1420 and the driver 1450.

Based on the scanning signal, the scanning circuit 1420 drives the motor 1430 by generating a drive signal for driving the motor 1430. The scanning circuit 1420 controls the motor 1430 so that the rotation angle of the motor 1430 output from the angle sensor 1440 follows the setting angle of the motor 1430 based on the scanning signal. The axis **141*a* of the movable optical system 140** is thereby set to the angle based on the scanning signal.

For example, the driver 1450 amplifies the drive signal output from the display controller 1410 and outputs the drive signals Dr1 to Drm. Based on the drive signals Dr1 to Drm, the pixels of the display device 110 respectively emit light L1 to Lm toward the movable optical system 140.

Light is sequentially incident on the movable optical system 140 and reflected by the movable optical system 140 according to the rotation angle of the axis **141*a*. FIG. 2 shows reflected light La1 to Lc1 of the light L1 emitted by the first pixel and reflected over time, that is, as the angle of the axis 141*a* and the movable optical system 140 rotating together with the axis 141*a*** advance. Similarly, the reflected light Lam to Lcm of the light Lm emitted by the mth pixel is shown.

Although FIG. 2 shows an example in which angle control of the motor 1430 is performed using the angle sensor 1440, an angle sensor may be unnecessary by employing a sensorless motor control system in the scanning circuit or by using a stepper motor.

Figure 3:
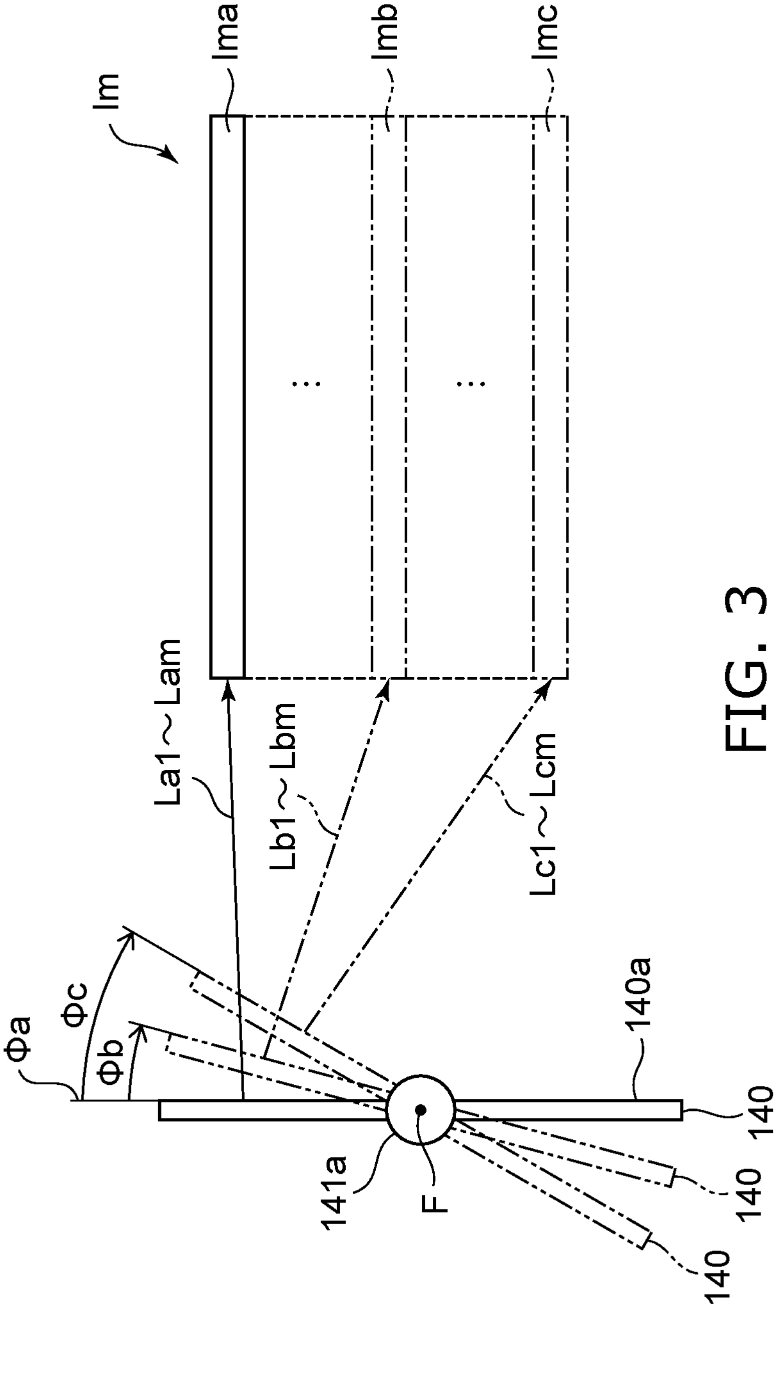
FIG. 3 is a schematic view for describing the operation of the movable optical system of the image display device according to the first embodiment.

FIG. 3 is a schematic view for describing the operation of the display device of the image display device according to the first embodiment.

FIG. 3 is a schematic view for describing how the light reflected by the angle corresponding to the movement state of the movable optical system 140 forms a first image that reproduces the image set in the display controller. FIG. 3 is for describing the operation principle and therefore shows the movable optical system 140 as a side view and shows only the reflected light. The movable optical system 140 includes the axis **141*a* and the mirror surface 140*a* in the depth direction of the page surface, and light that is emitted by the m pixels arranged in one column in the depth direction is incident on the mirror surface 140*a***. A front view of a first image Im is shown to illustrate the correspondence between the first image Im and the reflected light.

As shown in FIG. 3, the movable optical system 140 rotates clockwise around the axis **141*a*. An angle ϕa is 0°, and the position shown by the solid line is taken to be the initial position. FIG. 3 shows the movable optical system 140** illustrated by single dot-dash lines corresponding to angles ϕb and ϕc that increase over time. The angles ϕb and ϕc are referenced to the angle ϕa so that $\phi a<\phi b<\phi c$.

The reflected light La1 to Lam at the angle ϕa corresponds respectively to the light emitted by the m pixels. The reflected light Lb1 to Lbm at the angle ϕb corresponds respectively to the light emitted by the m pixels. The reflected light Lc1 to Lcm at the angle ϕc corresponds respectively to the light emitted by the m pixels.

The reflected light La1 to Lam at the angle ϕa forms a first image Ima at a position corresponding to the angle ϕa. The reflected light Lb1 to Lbm at the angle ϕb forms a first image Imb at a position corresponding to the angle ϕb. The reflected light Lc1 to Lcm at the angle ϕc forms a first image Imc at a position corresponding to the angle ϕc.

When the movable optical system 140 is rotated and the movable optical system 140 emits light according to the angles of the movable optical system 140, a first image is formed at the positions corresponding to the angles of the movable optical system 140. That is, the angles of the movable optical system 140 correspond to the scanning positions of the first image Im, and the first image Im is formed according to the scanning positions.

The movable optical system that reflects the light of the pixels is not limited to a galvano mirror and may be another reflective optical element. A polygon mirror can be used instead of a galvano mirror.

Figure 4A:
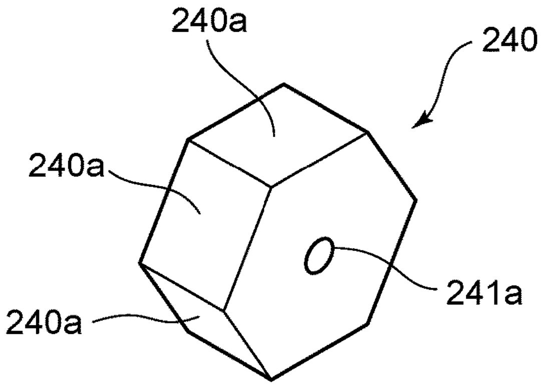
FIG. 4A is a schematic perspective view illustrating a modification of the movable optical system.

FIG. 4A is a schematic perspective view illustrating a modification of the movable optical system.

Figure 4B:
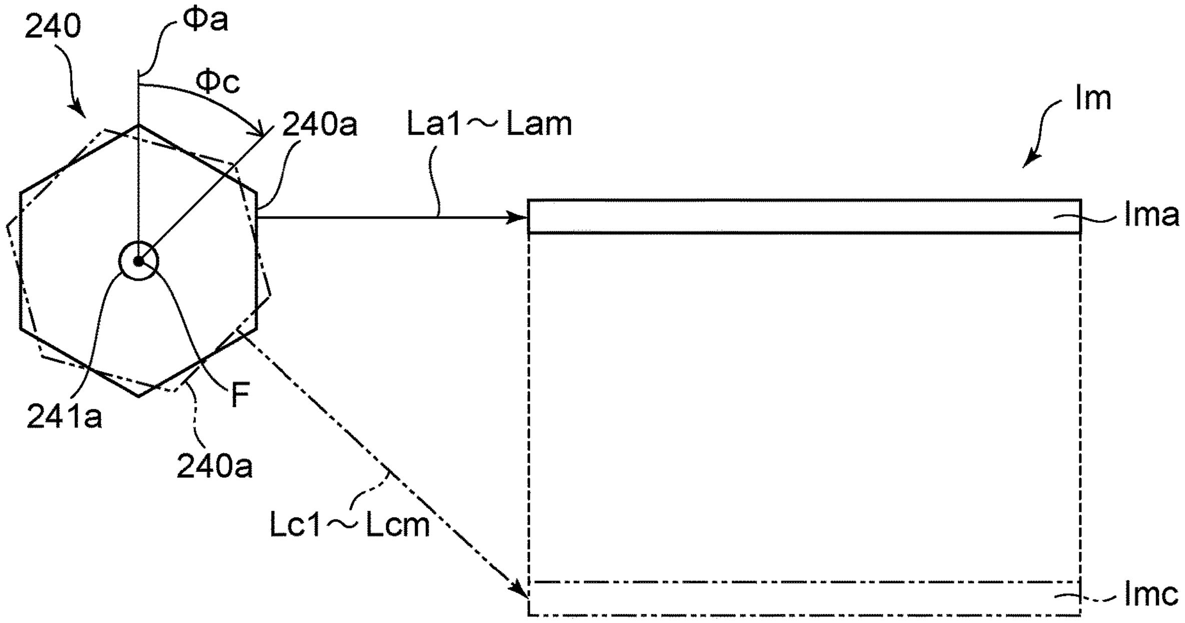
FIG. 4B is a schematic view for describing an operation of the movable optical system of FIG. 4A.

FIG. 4B is a schematic view for describing an operation of the movable optical system of FIG. 4A.

As shown in FIG. 4A, the movable optical system 240 is a polygon mirror. The movable optical system 240 which is a polygon mirror includes an axis 241*a* and multiple mirror surfaces 240*a*. In the example of FIGS. 4A and 4B, the movable optical system 240 includes six mirror surfaces 240*a*. The movable optical system 240 has a regular hexagonal prism shape, and the surfaces of the regular hexagon are used as the mirror surface 240*a*. The movable optical system 240 can be rotated around the axis 241*a*, and is movable by the motor shown in FIG. 2.

Similar to FIG. 3, FIG. 4B is a schematic view for describing the principle in which the light reflected at angles corresponding to the movement states of the movable optical system 240 form a first image that reproduces the image set in the display controller. The movable optical system 240 is shown as a side view, and only the reflected light is shown. The movable optical system 240 includes the axis 241*a* and the mirror surface 240*a* in the depth direction of the page surface, and the light that is emitted by the m pixels arranged in one column in the depth direction is incident on the mirror surface 240*a*. The front view of the first image Im is shown to illustrate the correspondence between the first image Im and the reflected light. Although the polygon mirror includes, for example, six mirror surfaces, FIG. 4B shows the reflected light of one mirror surface 240*a* among the six mirror surfaces.

As shown in FIG. 4B, the movable optical system 240 rotates clockwise around the axis 241*a*. The angle ϕa is 0°, and the position shown by the solid line is taken to be the initial position. The angle increases over time so that ϕa<ϕc.

The reflected light La1 to Lam at the angle ϕa corresponds respectively to the light emitted by the m pixels. The reflected light Lc1 to Lcm at the angle ϕc corresponds respectively to the light emitted by the m pixels.

The reflected light La1 to Lam at the angle ϕa forms the first image Ima at a position corresponding to the angle ϕa. The reflected light Lc1 to Lcm at the angle ϕc forms the first image Imc at a position corresponding to the angle ϕc.

When the movable optical system 240 is rotated and the movable optical system 240 emits light according to the angle of the movable optical system 240, the first images Im are formed at positions corresponding to the angles of the movable optical system 240. That is, as in the example shown in FIG. 3, the angles of the movable optical system 240 correspond to the scanning positions of the first image Im, and the first image Im is formed according to the scanning positions.

When the movable optical system 240 is a polygon mirror, the number of the mirror surfaces 240*a* is not limited to six as in FIGS. 4A and 4B, and may be four, five, eight, or more. In any case, more mirror surfaces per rotation of the movable optical system is possible with a polygon mirror than with a galvano mirror. By increasing the number of mirror surfaces per rotation of the movable optical system, different images can be displayed at a shorter cycle length. For example, a video image can be formed as the first and second images IM1 and IM2.

The display device 110 will now be described.

Figure 5A:
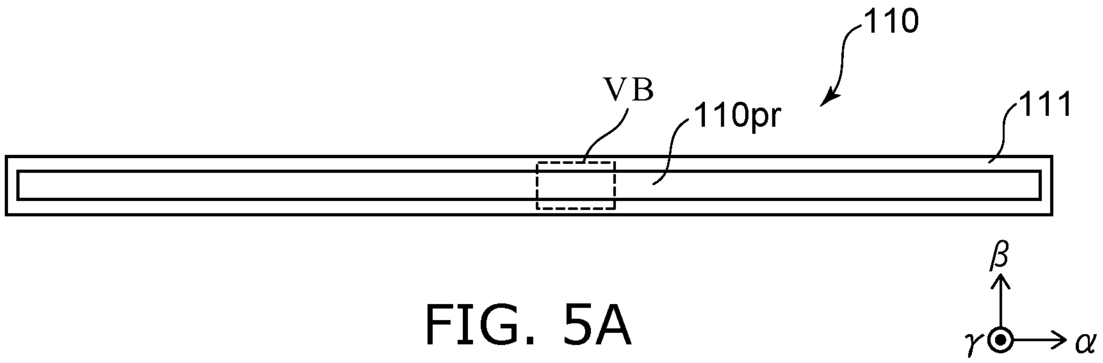
FIG. 5A is a schematic plan view illustrating a display device of the image display device according to the first embodiment.

FIG. 5A is a schematic plan view illustrating the display device of the image display device according to the first embodiment.

Figure 5B:
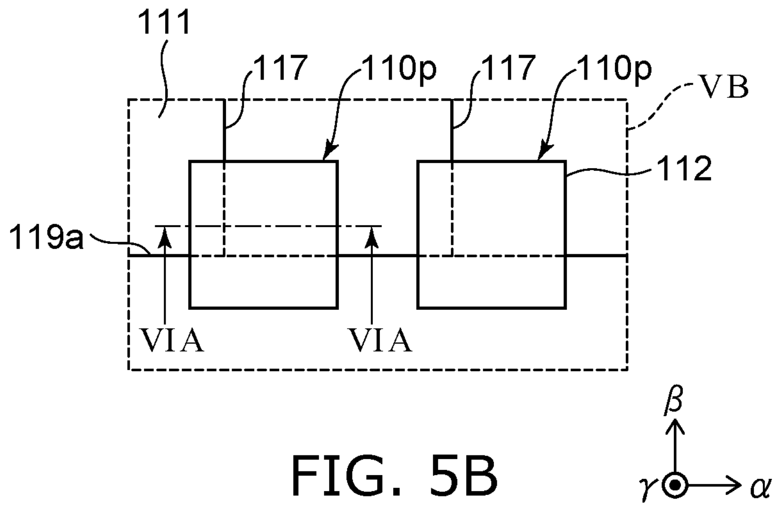
FIG. 5B is an enlarged schematic view of portion VB of FIG. 5A.

FIG. 5B is an enlarged schematic view of portion VB of FIG. 5A.

Figure 6A:
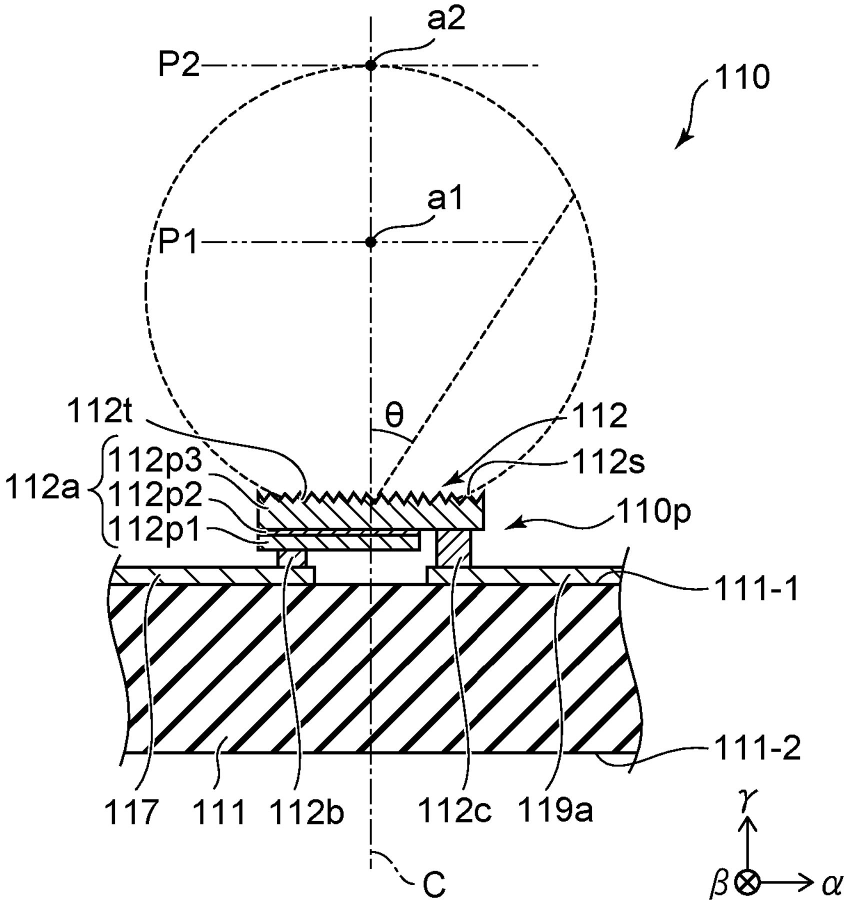
FIG. 6A is a schematic cross-sectional view along line VIA-VIA of FIG. 5B.

FIG. 6A is a schematic cross-sectional view along line VIA-VIA of FIG. 5B.

Figure 6B:
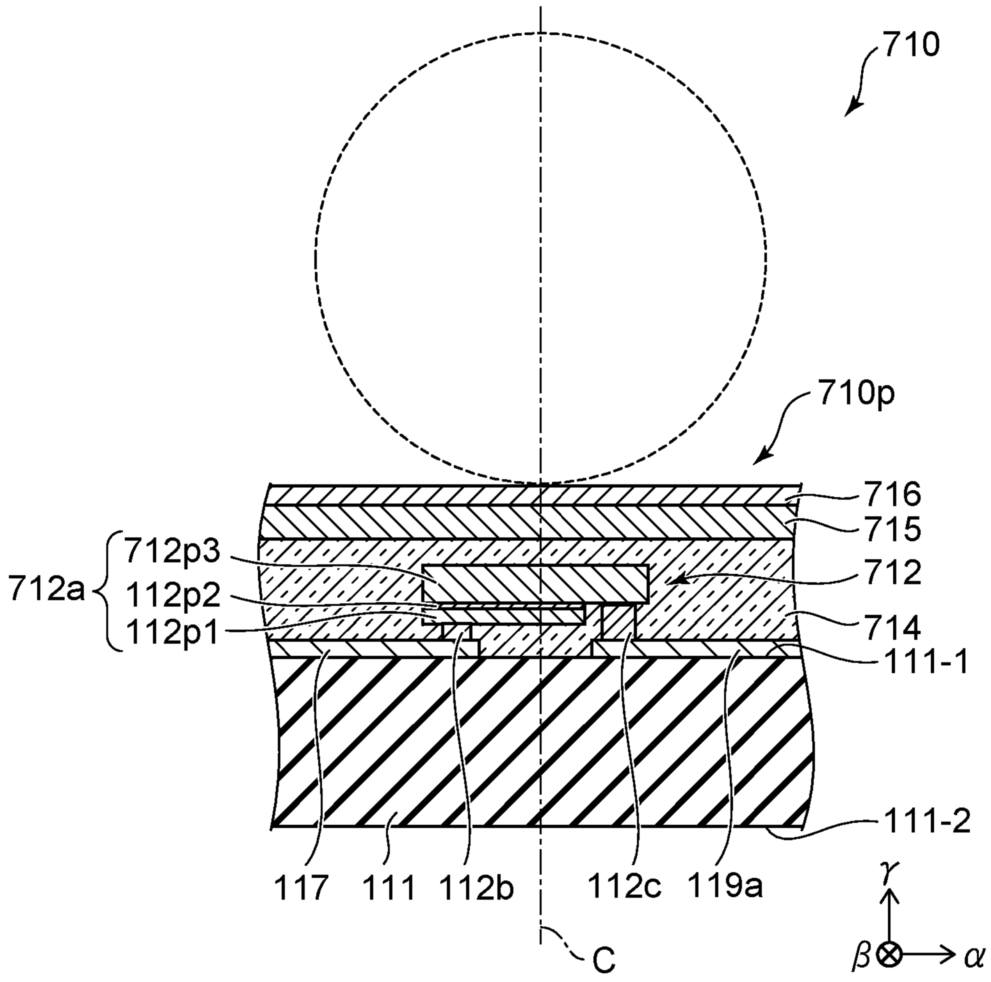
FIG. 6B is a schematic cross-sectional view illustrating a modification of the display device shown in FIG. 5A.

FIG. 6B is a schematic cross-sectional view illustrating a modification of the display device shown in FIG. 5A.

When describing the configuration and operation of the display device 110, a three-dimensional orthogonal coordinate system made of an α-axis, a β-axis, and a γ-axis may be used. The αβ-plane that includes the α-axis and the β-axis is taken as a plane parallel to a first surface 111-1 of a substrate 111 of the LED element 112 described with reference to FIGS. 6A and 6B. In a pixel column 110*pr*, the multiple pixels 110*p* are arranged along the direction of the α-axis (first direction). The direction from a second surface 111-2 toward the first surface 111-1 of the substrate 111 is taken as the positive direction of the γ-axis. The second surface 111-2 is the surface at the side opposite to the first surface 111-1.

The positive direction of the α-axis is called the "+αdirection," and the negative direction of the α-axis is called the "−αdirection." The positive direction of the β-axis is called the "+βdirection," and the negative direction of the β-axis is called the "−βdirection." The positive direction of the γ-axis is called the "+γdirection," and the negative direction of the γ-axis is called the "−γdirection." Simply "when viewed in plan" may be used when viewing a plane parallel to the αβ-plane from the +γdirection or the −γdirection.

As shown in FIG. 5A, the display device 110 includes the pixel column 110*pr* that includes the multiple pixels 110*p*. The multiple pixels 110*p* are arranged along the α-direction. m pixels 110*p* are arranged along the α-direction, and m is an integer not less than 2.

As shown in FIG. 5B, the display device 110 includes, for example, the substrate 111, the multiple LED elements 112, m drive lines 117, and a ground line 119*a*.

For example, the substrate 111 has a rectangular flat plate shape having the long sides in the α-direction. The substrate 111 can include, for example, glass, a resin such as polyimide, etc., and an n-semiconductor material of Si or the like may be used. As shown in FIG. 5B, the multiple LED elements 112 are arranged in one column along the αdirection on the substrate 111.

For example, as shown in FIG. 6A, each LED element 112 is mounted face-down on the substrate 111. Each LED element 112 may be mounted face-up on the substrate 111. Each LED element 112 includes a semiconductor stacked body 112*a*, an anode electrode 112*b*, and a cathode electrode 112*c*.

The semiconductor stacked body 112*a* includes a p-type semiconductor layer 112*p*1, an active layer 112*p*2 located on the p-type semiconductor layer 112*p*1, and an n-type semiconductor layer 112*p*3 located on the active layer 112*p*2. The semiconductor stacked body 112*a* includes, for example, a gallium nitride compound semiconductor of $In_XAl_YGa_{1-X-Y}N$ ($0 \leq X$, $0 \leq Y$, and $X+Y<1$). According to the embodiment, the light that is emitted by the LED element 112 is visible light.

The anode electrode 112*b* is electrically connected to the p-type semiconductor layer 112*p*1. Also, the anode electrode 112*b* is electrically connected to the drive line 117. The drive line 117 is electrically connected to the driver 1450 shown in FIG. 2. The cathode electrode 112*c* is electrically connected to the n-type semiconductor layer 112*p*3. Also, the cathode electrode 112*c* is electrically connected to the ground line 119*a*. The anode electrode 112*b* and the cathode electrode 112*c* can include, for example, a metal material.

According to the embodiment, multiple recesses 112*t* are provided in a light-emitting surface 112*s* of each LED element 112. In the specification, "the light-emitting surface of the LED element" means the surface of the LED element that mainly emits the light that is incident on the imaging optical system 120. According to the embodiment, the surface of the n-type semiconductor layer 112*p*3 that is positioned at the side opposite to the surface facing the active layer 112$p$2 corresponds to the light-emitting surface 112$s$.

Examples of methods for providing the multiple recesses 112$t$ in the surface of the n-type semiconductor layer 112$p$3 positioned at the side opposite to the surface facing the active layer 112$p$2 include, for example, a method in which multiple protrusions are formed in the upper surface of a growth substrate, the n-type semiconductor layer 112$p$3, the active layer 112$p$2, and the p-type semiconductor layer 112$p$1 are grown in this order on the growth substrate, and the n-type semiconductor layer 112$p$3 and the growth substrate are detached by LLO (Laser Lift Off) or the like, a method of performing surface roughening of the surface of the n-type semiconductor layer 112$p$3 to form the multiple recesses 112$t$ after detaching the growth substrate, etc. Methods of surface roughening include anisotropic etching, etc.

Hereinbelow, the optical axis of the light emitted from each pixel 110$p$ is called simply an "optical axis C." As shown in FIG. 6A, the optical axis C is, for example, a straight line that connects a point a1 in a first plane P1 and a point a2 in a second plane P2, wherein the first plane P1 is parallel to the $\alpha\beta$-plane and positioned at the light-emitting side of the display device, and the luminance is a maximum at the point a1 in the range in which the light is irradiated from one pixel 110$p$, the second plane P2 is parallel to the $\alpha\beta$-plane and separated from the first plane P1 in the +$\gamma$direction, and the luminance is a maximum at the point a2 in the range in which the light is irradiated from the one pixel 110$p$. For example, if the luminance has maxima at multiple points, the center of the points may be used as the maximum luminance point. From the perspective of productivity, it is desirable for the optical axis C to be parallel to the $\gamma$-axis.

Thus, by providing the multiple recesses 112$t$ in the light-emitting surface 112$s$ of each LED element 112, the light that is emitted from each LED element 112, i.e., the light that is emitted from each pixel 110$p$, has a substantially Lambertian light distribution as shown by the broken-line curve in FIG. 6A. "The light emitted from each pixel has a substantially Lambertian light distribution" means a light distribution pattern in which the luminous intensity in the direction of an angle $\theta$ with respect to the optical axis C of each pixel 110$p$ can be approximated by $\cos^n \theta$ times the luminous intensity at the optical axis C, wherein n is a value greater than 0. Here, it is favorable for n to be not more than 11, and more favorably 1. Although many planes including the optical axis C of the light emitted from one pixel 110$p$ exist, the light distribution pattern of the light emitted from the one pixel 110$p$ has a substantially Lambertian light distribution in each plane, and the numerical values of n are substantially equal.

However, the configuration of each LED element is not limited to that described above. For example, multiple protrusions instead of multiple recesses may be provided in the light-emitting surface of each LED element, or both multiple recesses and multiple protrusions may be provided. When the growth substrate is light-transmissive, the growth substrate may not be detached from the semiconductor stacked body, and multiple recesses and/or multiple protrusions may be provided in the surface of the growth substrate corresponding to the light-emitting surface. In such configurations as well, the light that is emitted from each LED element has a substantially Lambertian light distribution. Also, in each LED element, an n-type semiconductor layer may be provided to face the substrate, an active layer and a p-type semiconductor layer may be stacked in this order on the n-type semiconductor layer, and the surface of the p-type semiconductor layer at the side opposite to the surface facing the active layer may be used as the light-emitting surface of the LED element. As described in other embodiments described below, it is sufficient for the light finally emitted from each pixel to have a substantially Lambertian light distribution, and the light that is emitted from each LED element may not have a substantially Lambertian light distribution.

The driver 1450 shown in FIG. 2 outputs currents respectively to the multiple LED elements 112 via the multiple drive lines 117. The LED elements 112 emit light of brightnesses corresponding to the current values because the driver 1450 sets the current values of the LED elements 112 to which the currents are supplied. Although the driver is located separately from the display device 110 in the example shown in FIG. 5A, for example, the driver may be formed on the substrate 111 by using a low-temperature polysilicon (LTPS) process.

FIG. 6B is a cross-sectional view showing a modification of the display device of the image display device according to the first embodiment.

According to the modification, a pixel 710$p$ of the display device 710 includes the LED element 712. The LED element 712 includes a semiconductor stacked body 712$a$, and the semiconductor stacked body 712$a$ includes an n-type semiconductor layer 712$p$3. The LED element 712 differs from the example shown in FIG. 6A in that the surface of the n-type semiconductor layer 712$p$3 positioned at the side opposite to the surface facing the active layer 112$p$2 is substantially flat, and a protective layer 714, a wavelength conversion member 715, and a color filter 716 are further included.

The protective layer 714 covers multiple LED elements 712 arranged in a matrix configuration. The protective layer 714 can include, for example, a light-transmitting material such as a polymer material that includes a sulfur (S)-including substituent group or a phosphorus (P) atom-including group, a high refractive index nanocomposite material in which inorganic nanoparticles having a high refractive index are introduced to a polymer matrix of polyimide, etc.

The wavelength conversion member 715 is located on the protective layer 714. That is, the wavelength conversion member 715 located on each of the multiple LED elements 112. The wavelength conversion member 715 includes one or more types of wavelength conversion material such as a general fluorescer material, a perovskite fluorescer material, a quantum dot (QD), etc. The light that is emitted from each LED element 712 is incident on the wavelength conversion member 715. The wavelength conversion material that is included in the wavelength conversion member 715 emits light of a different light emission peak wavelength from the light emission peak wavelength of the LED element 712 by the light emitted from the LED element 712 being incident on the wavelength conversion material. The light that is emitted by the wavelength conversion member 715 has a substantially Lambertian light distribution.

The color filter 716 is located on the wavelength conversion member 715. The color filter 716 is configured to shield the greater part of the light emitted from the LED element 712. Accordingly, the light that is emitted mainly by the wavelength conversion member 715 is emitted from each pixel 710$p$. Therefore, as shown by the broken-line curve in FIG. 6B, the light that is emitted from each pixel 710$p$ has a substantially Lambertian light distribution. When the greater part of the light emitted from the LED element 712 is absorbed by the wavelength conversion member 715, a color filter may not be included. Thus, the light that is emitted from each pixel can have a Lambertian light distribution even when multiple recesses or protrusions are not provided in the light-emitting surface of the LED element.

According to the embodiment, the light emission peak wavelength of the LED element 712 may be in the ultraviolet region or may be in the visible light region. When blue light is to be emitted from at least one pixel 710*p*, for example, blue light may be emitted from the LED element 712 of such a pixel 710*p*, and the wavelength conversion member 715 and the color filter 716 may not be provided for this pixel 710*p*. In such a case, the light that is emitted from the pixel 710*p* may have a substantially Lambertian light distribution by providing a light-scattering member including light-scattering particles to cover the LED element 712.

Any of the display devices 110 and 710 may be included in the light source unit 11 and/or the image display device 10. In the following description, the display device 110 includes the pixel 110*p* unless otherwise noted.

Instead of being separately manufactured and then mounted on a substrate, the LED element may be formed on the substrate by using a semiconductor material such as silicon (Si) or the like as the substrate. The display device is not limited to an LED display and may be another display in which the emitted light has a substantially Lambertian light distribution.

The description of the configuration of the light source unit 11 continues now by returning to FIG. 1.

The imaging optical system 120 of the light source unit 11 is an optical system that includes all of the optical elements necessary for forming the first image IM1 at the prescribed position. According to the embodiment, the imaging optical system 120 further includes an intermediate element 122 located between the movable optical system 140 and the output element 123. The imaging optical system may not include an intermediate element. As shown in FIG. 1, the light emitted from the output element 123 forms the first image IM1 at the formation position P.

The intermediate element 122 is positioned at the −X side of the display device 110 and the movable optical system 140. The intermediate element 122 is arranged to face the mirror surface 140*a* of the movable optical system 140. The intermediate element 122 is a mirror that includes a concave mirror surface 122*a*. The intermediate element 122 further reflects the light reflected by the movable optical system 140.

The intermediate element 122 is included in a bending part 120*a* that bends the chief rays La to Lc of the light emitted according to the angle of the movable optical system 140 to cause the chief rays La to Lc to be substantially parallel. According to the embodiment, the mirror surface 122*a* is a biconic surface. The mirror surface may be a portion of a spherical surface or may be a freeform surface.

The output element 123 is positioned at the +X side of the display device 110 and the movable optical system 140. The output element 123 is arranged to face the intermediate element 122. The output element 123 is a mirror that includes a flat mirror surface 123*a*. Light that travels via the movable optical system 140 and the intermediate element 122 is reflected by the output element 123 and emitted by the output element 123 toward the formation position P of the first image IM1.

Specifically, the chief rays La to Lc that are substantially parallel due to the bending part 120*a* are incident on the output element 123. The mirror surface 123*a* is tilted in the −Z/+X direction with respect to the XY-plane, i.e., the horizontal plane of the vehicle 13. As a result, the output element 123 reflects the light reflected by the intermediate element 122 in a direction tilted in the −Z/+X direction with respect to the Z-direction. As shown in FIG. 1, the output element 123 is included in a direction modifying part 120*b* that modifies the directions of the chief rays La to Lc caused to be substantially parallel by the bending part 120*a* so that the chief rays La to Lc are directed toward the formation position P of the first image IM1.

According to the embodiment, the optical path between the movable optical system 140 and the intermediate element 122 extends in a direction crossing the XY-plane. The optical path between the intermediate element 122 and the output element 123 extends in a direction along the XY-plane. Because a portion of the optical path inside the imaging optical system 120 extends in a direction crossing the XY-plane, the light source unit 11 can be somewhat smaller in directions along the XY-plane. Also, because another portion of the optical path inside the imaging optical system 120 extends in a direction along the XY-plane, the light source unit 11 can be somewhat smaller in the Z-direction.

As in the example of FIG. 1, the display device 110 and the movable optical system 140 can be located between the intermediate element 122 and the output element 123. Therefore, the light source unit 11 can be smaller. The optical paths inside the light source unit are not limited to those described above. For example, all of the optical paths inside the imaging optical system may extend in directions along the XY-plane, or may extend in directions crossing the XY-plane.

The intermediate element 122 and the output element 123 each may include a main member made of glass, a resin material, or the like and a reflective film such as a metal film, a dielectric multilayer film, or the like forming the mirror surfaces 122*a* and 123*a* located at the surface of the main member. The intermediate element 122 and the output element 123 may be entirely formed of a metal material.

According to the embodiment as shown in FIG. 1, the light source unit 11 is located at a ceiling part 13*b* of the vehicle 13. For example, the light source unit 11 is located at the inner side of a wall 13*s*1 of the ceiling part 13*b* exposed inside the vehicle. A through-hole 13*h*1 through which the light emitted from the output element 123 of the light source unit 11 can pass is provided in the wall 13*s*1. The light that is emitted from the output element 123 passes through the through-hole 13*h*1 and is irradiated on the space between the user 14 and the front windshield 13*a*. The light source unit may be mounted to the ceiling surface. A transparent or semi-transparent cover may be located in the through-hole 13*h*1. It is favorable for the haze value of the cover of the through-hole 13*h*1 to be not more than 50%, and more favorably not more than 20%.

Although the imaging optical system 120 is described above, the configuration and position of the coupling optical system are not limited to those described above as long as the coupling optical system is substantially telecentric at the first image side. For example, the number of optical elements included in the direction modifying part may be two or more.

The reflection unit 12 will now be described.

According to the embodiment, the reflection unit 12 includes a mirror 131 that includes a concave mirror surface 131*a*. According to the embodiment, the mirror surface 131*a* is a biconic surface. The mirror surface is not limited to a biconic surface and may be a portion of a spherical surface or may be a freeform surface. As shown in FIG. 1, the mirror 131 is arranged to face the front windshield 13*a*. The mirror 131 reflects the light emitted from the output element 123 and emits the light toward the front windshield 13*a*. The light that is emitted toward the front windshield 13*a* is reflected by the inner surface of the front windshield 13*a* and enters the eyebox 14*a* of the user 14. As a result, the user 14 views the second image IM2 corresponding to the image displayed by the display device 110 at the +X side of the front windshield 13*a*.

The mirror 131 may include a main member made of glass, a resin material, or the like and a reflective film such as a metal film, a dielectric multilayer film, or the like forming the mirror surface 131*a* located at the surface of the main member. The mirror 131 may be entirely formed of a metal material.

According to the embodiment, the reflection unit 12 is located at a dashboard part 13*c* of the vehicle 13. For example, the reflection unit 12 is located at the inner side of a wall 13*s*2 of the dashboard part 13*c* of the vehicle 13 exposed inside the vehicle. A through-hole 13*h*2 through which the light emitted from the output element 123 of the light source unit 11 can pass is provided in the wall 13*s*2. The light that is emitted from the output element 123 passes through the through-hole 13*h*1, forms the first image IM1, subsequently passes through the through-hole 13*h*2, and is irradiated on the reflection unit 12. The reflection unit may be mounted to the upper surface of the dashboard part. The reflection unit may be located at the ceiling part, and the light source unit may be located at the dashboard part.

As shown in FIG. 1, the light that travels from the inner surface of the front windshield 13*a* toward the eyebox 14*a* is positioned at the XY-plane. Here, "the light that travels from the inner surface of the front windshield 13*a* toward the eyebox 14*a* is positioned at the XY-plane" means that a portion of the light traveling from the inner surface of the front windshield 13*a* toward the eyebox 14*a* is positioned at the XY-plane. With this XY-plane as a boundary, the light source unit 11 is located in a region at the +Z side. In other words, the light source unit 11 is separated in the +Z direction from the XY-plane. Also, with the plane XY as a boundary, the reflection unit 12 is located in a region at the −Z side. In other words, the reflection unit 12 is separated in the −Z direction from the XY-plane. The arrangement of the light source unit and the reflection unit is not limited to that described above.

The configuration and position of the reflection unit are not limited to those described above. For example, the number of optical elements such as mirrors and the like included in the reflection unit may be two or more. It goes without saying that the reflection unit 12 must be arranged so that, for example, sunlight that is irradiated from outside the vehicle via the front windshield 13*a* is not reflected toward the eyebox 14*a*.

Effects of the image display device 10 according to the embodiment will now be described.

In the light source unit 11 of the image display device 10 according to the embodiment, the imaging optical system 120 is substantially telecentric at the first image IM1 side, and the light that is emitted from the display device 110 has a substantially Lambertian light distribution. Therefore, the quality of the first image IM1 can be improved while downscaling the light source unit 11. More specifically, because the light emitted from the display device 110 has a substantially Lambertian light distribution, the dependence on the angle of the luminous intensity and/or chromaticity of the light emitted from the pixels 110*p* of the display device 110 can be reduced.

As an exact Lambertian light distribution is approached, that is, as the approximation formula of the light distribution pattern approaches $\cos^n\theta$ in which n is 1, the luminous intensity and/or chromaticity of the light emitted from the pixels 110*p* of the display device 110 is substantially uniform regardless of the angle. Therefore, the fluctuation of the luminance and/or chromaticity of the first image IM1 can be suppressed, and the quality of the first image IM1 can be improved.

In the imaging optical system 120, the movable optical system 140 is located at the focal point F of the light that is substantially telecentric at the first image IM1 side. As a result, the imaging optical system 120 guarantees that light that is substantially telecentric at the first image IM1 side is emitted.

The light source unit 11 includes the pixel column 110*pr* that includes the multiple pixels 110*p* arranged along one direction. Therefore, the display device 110 can be smaller, and the light source unit 11 can be smaller. The number of LED elements necessary to display the first image IM1, and thus the second image IM2, can be reduced; therefore, the manufacturing cost or procurement cost of the display device can be reduced.

The light that is emitted from the display device 110 is incident on the movable optical system 140 that includes the axis 141*a* extending along a direction parallel to the direction along which the pixel column 110*pr* is formed. The movable optical system 140 is movable around the axis 141*a* and emits light at an angle corresponding to the movement state. The display device 110 emits the light over time, and the light is sequentially incident on and reflected by the movable optical system 140 at the angles corresponding to the times at which the light is emitted. As a result, the light source unit 11 can emit light to reproduce a preset image.

The image display device 10 according to the embodiment includes the light source unit 11, and the reflection unit 12 that is separated from the light source unit 11 and reflects the light emitted from the imaging optical system 120. The first image IM1 is formed between the light source unit 11 and the reflection unit 12. In such a case, the light that is emitted from one point of the display device 110 travels via the output element 123 and then is condensed at the formation position P of the first image IM1. On the other hand, when the first image IM1 is not formed between the light source unit 11 and the reflection unit 12, the light diameter of the light emitted from one point of the display device 110 gradually spreads from an input element 121 toward the reflection unit 12. Accordingly, according to the embodiment, the irradiation area on the output element 123 of the light emitted from the one point of the display device 110 can be less than when the first image IM1 is not formed. Therefore, the output element 123 can be smaller.

Because the light source unit 11 according to the embodiment is small, the light source unit 11 can be easily located in the limited space inside the vehicle 13 when the light source unit 11 is mounted in the vehicle 13 and used as a head-up display.

According to the embodiment, the imaging optical system 120 includes the bending part 120*a* and the direction modifying part 120*b*. Thus, the design of the imaging optical system 120 is easier because the part of the imaging optical system 120 having the function of making the chief rays parallel to each other and the part of the imaging optical system 120 forming the first image IM1 at the desired position are separate.

A portion of the optical path inside the imaging optical system 120 extends in a direction crossing the XY-plane orthogonal to the Z-direction. Therefore, the imaging optical system 120 can be somewhat smaller in directions along the XY-plane.

Another portion of the optical path inside the imaging optical system 120 extends in directions along the XY-plane orthogonal to the Z-direction. Therefore, the imaging optical system 120 can be somewhat smaller in the Z-direction.

Second Embodiment

Figure 7:
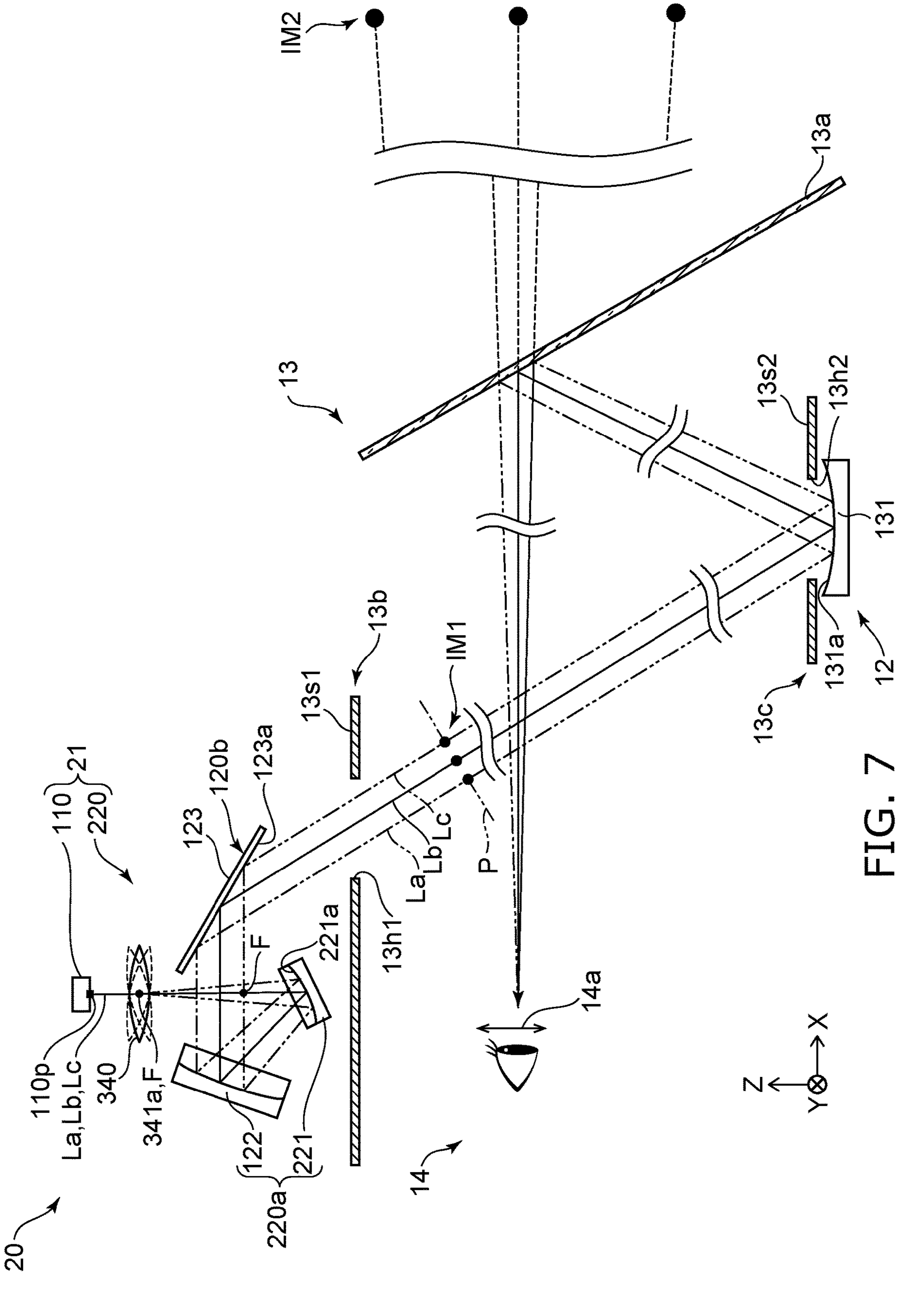
FIG. 7 is a schematic cross-sectional view showing a head-up display in which an image display device according to a second embodiment is applied.

FIG. 7 is a schematic cross-sectional view showing a head-up display in which an image display device according to a second embodiment is applied.

As shown in FIG. 7, the image display device 20 according to the embodiment includes a light source unit 21 and the reflection unit 12. The light source unit 21 of the image display device 20 according to the embodiment is different from the light source unit 11 shown in FIG. 1. Otherwise, the configuration of the image display device 20 according to the embodiment is the same as the configuration of the image display device 10 according to the first embodiment; the same components are marked with the same reference numerals, and a detailed description is omitted as appropriate.

The light source unit 21 includes the display device 110 and an imaging optical system 220. The display device 110 can be similar to the display device 110 shown in FIG. 1, and a detailed description is omitted. The imaging optical system 220 includes a movable optical system 340, an input element 221, the intermediate element 122, and the output element 123. In the example shown in FIG. 7, the intermediate element 122 and the output element 123 are the same as those of the example shown in FIG. 1.

The movable optical system 340 is located at the vicinity of the focal point F of the imaging optical system 220 and is arranged to transmit the light traveling via the focal point F. The movable optical system 340 is a light-transmitting movable lens including an axis 341*a*. In the example of FIG. 7, the axis 341*a* of the movable optical system 340 is arranged to be parallel to the Y-direction. The movable optical system 340 which is a movable lens is movable around the axis 341*a*. For example, the movable optical system 340 rotates clockwise at a constant speed around the axis 341*a*. The light that is emitted by the display device 110 is incident on and emitted by the movable optical system 340 at an angle corresponding to the movement state of the display device.

As in the movable optical system 140 shown in FIG. 1, the light that corresponds to the chief ray La is incident on and emitted by the movable optical system 340 at the angle at the time at which the light corresponding to the chief ray La is emitted by the display device 110. The light that corresponds to the chief ray Lb is incident on and emitted by the movable optical system 340 at the angle at the time at which the light corresponding to the chief ray Lb is emitted by the display device 110. The light that corresponds to the chief ray Lc is incident on and emitted by the movable optical system 340 at the angle at the time at which the light corresponding to the chief ray Lc is emitted by the display device 110.

By appropriately setting the cycle length of the light emitted by the display device 110 and the rotational speed of the movable optical system 340, the display device 110 and the movable optical system 340 sequentially emit the light toward the output element 123 to form one image. The output element 123 sequentially reflects the incident light, and the reflected light forms the first image IM1. A system similar to the display control system 1400 described with reference to FIG. 2 is applicable to the cycle length of the light emitted by the display device 110 and the rotational speed of the movable optical system 340.

The movable optical system 340 is a movable lens that rotates around the axis 341*a* in the specific example shown in FIG. 7; however, as long as a transmissive movable optical system is used, the movable optical system is not limited to a movable lens and may be, for example, a prism that is movable or rotates around an axis, etc.

In the example shown in FIG. 7, the imaging optical system 220 includes the input element 221. The input element 221 is arranged in the −Z direction with the display device 110 and the movable optical system 340 and arranged to face the movable optical system 340. The input element 221 is located between the intermediate element 122 and the output element 123. The input element 221 is a mirror that includes a concave mirror surface 221*a*. The mirror surface 221*a* is, for example, a biconic surface and may be a portion of a spherical surface or may be a freeform surface. The input element 221 reflects the light emitted by the movable optical system 340 and emits the light toward the intermediate element 122.

The input element 221 and the intermediate element 122 are included in a bending part 220*a* that bends the chief rays La to Lc of the light emitted at the angle corresponding to the movement state of the movable optical system 340 to cause the chief rays La to Lc to be substantially parallel.

In the light source unit 21 configured as described above, the light that is emitted by the display device 110 has a substantially Lambertian light distribution, and the light that is emitted by the light source unit 21 is telecentric and forms the first image IM1 at the formation position P.

In the example shown in FIG. 7, the display device 110 and the movable optical system 340 are located further in the +Z direction than the intermediate element 122 and the output element 123 so that the movable optical system 340 does not shield the optical path between the intermediate element 122 and the output element 123. The arrangement of the display device 110 and the movable optical system 340 is not limited to the example as long as the optical path due to the display device 110, the movable optical system 340, and the input element 221 does not shield the optical path between the intermediate element 122 and the output element 123. For example, the optical path due to the display device 110, the movable optical system 340, and the input element 221 may be further tilted in the +Y direction or the −Y direction in the YZ-plane. Thus, the dimension in the Z-direction of the light source unit 21 can be reduced.

Figure 8:
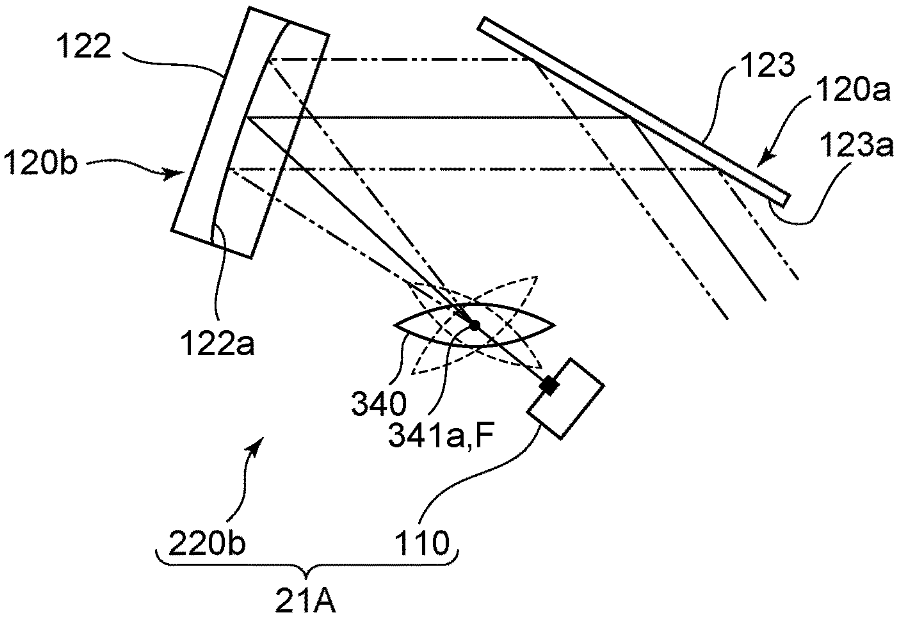
FIG. 8 is a schematic view illustrating a modification of the light source unit shown in FIG. 7.

FIG. 8 is a schematic view illustrating a modification of the light source unit shown in FIG. 7.

As shown in FIG. 8, the light source unit 21A includes the display device 110 and an imaging optical system 220*b*. The imaging optical system 220*b* includes the movable optical system 340, the intermediate element 122, and the output element 123. According to the modification, the input element 221 of the light source unit 21 shown in FIG. 7 is omitted, and the movable optical system 340 is located at the position of the input element 221. As in the example shown in FIG. 7, the movable optical system 340 is located at the vicinity of the focal point F of the light caused to have substantially parallel chief rays by the optical system made of the intermediate element 122 and the output element 123.

By such a configuration and arrangement, the number of components can be reduced, and the dimension in the Z-direction of the light source unit 21A can be reduced.

Effects of the image display device 20 according to the embodiment will now be described.

The image display device 20 according to the embodiment provides effects similar to those of the image display device 10 according to the first embodiment. The image display device 20 according to the embodiment also provides the following effects. Namely, the image display device 20 includes the light source unit 21 that includes the transmissive movable optical system 340. Because the movable optical system 340 is transmissive, the loss due to the reflection of the light can be suppressed, and a clearer first image can be formed. Because the movable optical system 340 is transmissive, the degree of freedom of the arrangement of the members included in the light source unit 21 can be increased, and a structure design that matches the mounting location is possible.

Third Embodiment

Figure 9A:
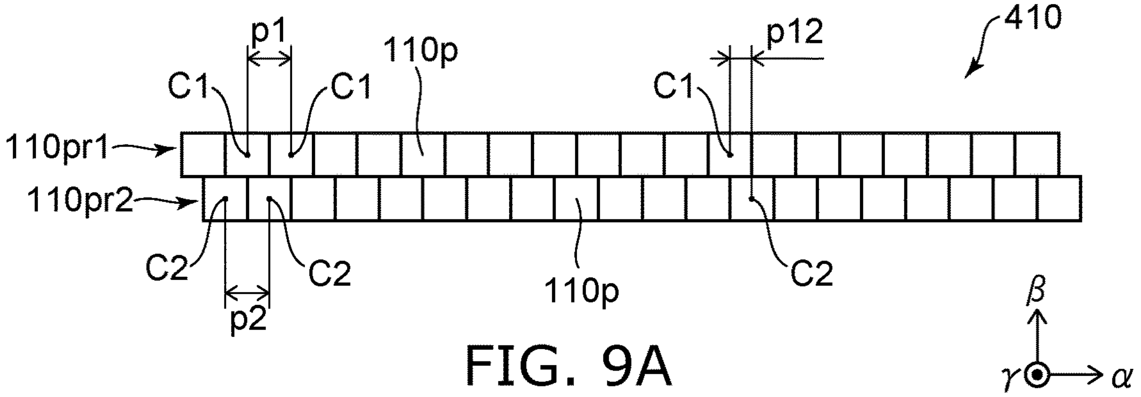
FIG. 9A is a schematic view illustrating a display device of an image display device according to a third embodiment.

FIG. 9A is a schematic view illustrating a display device of an image display device according to a third embodiment.

According to the embodiment as shown in FIG. 9A, the display device 410 includes a pixel column (a first pixel column) 110*pr*1 that includes the multiple pixels 110*p* arranged along the α-direction. The display device 410 includes a pixel column (a second pixel column) 110*pr*2 adjacent to the pixel column 110*pr*1 in the β-direction (second direction). The pixel column 110*pr*2 includes the multiple pixels 110*p* arranged along the α-direction. The substrate is not illustrated in FIG. 9A. Similar to the display device 110 shown in FIGS. 5A and 5B, the display device 410 includes the pixel columns 110*pr*1 and 110*pr*2 on the substrate, and the configuration of each pixel 110*p* is similar to that of the example shown in FIG. 6A.

A pixel pitch (first pixel pitch) p1 of the adjacent pixels 110*p* in the pixel column 110*pr*1 is equal to a pixel pitch (second pixel pitch) p2 in the pixel column 110*pr*2. The pixel pitch p1 is defined as the shortest length between centers C1 of two pixels 110*p* adjacent in the α-direction, and the pixel pitch p2 is defined as the shortest length between centers C2 of two pixels 110*p* adjacent in the α-direction. When the shape of the pixel 110*p* when the αβ-plane is viewed in plan is rectangular as in the example of FIG. 9A, the center of the pixel 110*p* is the intersection of the diagonals. More generally, the center of the pixel 110*p* is the position of the centroid of the shape of the pixel 110*p* when the αβ-plane is viewed in plan.

A length p12 along the α-direction between the center C1 of one pixel (first pixel) 110*p* among the multiple pixels 110*p* included in the pixel column 110*pr*1 and the center C2 of one pixel (second pixel) 110*p* among the multiple pixels 110*p* included in the pixel column 110*pr*2 is greater than 0. The length p12 is the length in the α-direction between the centers C1 and C2 of two pixels 110*p* adjacent in the β-direction. In the example shown in FIG. 9A, the length p12 in the α-direction between the centers C1 and C2 of two pixels 110*p* adjacent in the β-direction is ½ of the pixel pitches p1 and p2. That is, the multiple pixels 110*p* included in the pixel column 110*pr*1 and the multiple pixels 110*p* included in the pixel column 110*pr*2 are arranged so that the positions of the centers are shifted from each other by ½ of the pixel pitches p1 and p2.

By appropriately setting the cycle length of the light emitted by the display device 410 and the rotational speed of the movable optical system 140, the display device 410 and the movable optical system 140 sequentially emit the light toward the output element 123 to form one image. The output element 123 sequentially reflects the incident light, and the reflected light forms the first image IM1. A system similar to the display control system 1400 described with reference to FIG. 2 is applicable to the cycle length of the light emitted by the display device 410 and the rotational speed of the movable optical system 140.

Effects of the image display device according to the embodiment will now be described.

The image display device according to the embodiment provides effects similar to those of the image display device 10 according to the first embodiment described above. The image display device according to the embodiment also provides the following effects. Namely, the image display device according to the embodiment includes a light source unit that includes the display device 410. The display device 410 includes the pixel columns 110*pr*1 and 110*pr*2 adjacent to each other in the β-direction. In the pixel columns 110*pr*1 and 110*pr*2, the length in the α-direction of each pixel 110*p* is p1=p2. That is, according to the embodiment, the density in the α-direction of the pixel 110*p* of the display device 410 can be substantially increased without reducing the length in the α-direction of the pixel 110*p* or increasing the length in the α-direction of the display device 410. By substantially increasing the density of the pixel 110*p* in the α-direction in the display device 410, the display device 410 can emit light to reproduce a high-definition image.

Figure 9B:
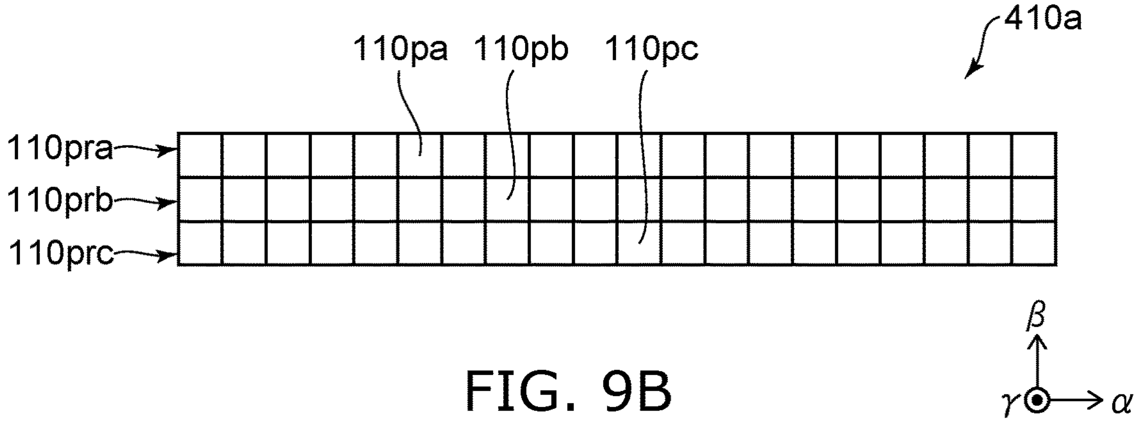
FIG. 9B is a schematic view illustrating a modification of the display device of the image display device according to the third embodiment.

FIG. 9B is a schematic view illustrating a modification of the display device of the image display device according to the third embodiment.

According to the embodiment as shown in FIG. 9B, the display device 410*a* includes a first pixel column 110*pra*, a second pixel column 110*prb*, and a third pixel column 110*prc*. The second pixel column 110*prb* is located adjacent to the first pixel column 110*pra* in the β-direction. The third pixel column 110*prc* is located adjacent to the second pixel column 110*prb* in the β-direction. In the example, the first pixel column 110*pra*, the second pixel column 110*prb*, and the third pixel column 110*prc* are arranged in this order in the −βdirection.

The first pixel column 110*pra* includes multiple first pixels 110*pa*. The multiple first pixels 110*pa* are arranged along the α-direction. The multiple first pixels 110*pa*, for example, emit red light. The second pixel column 110*prb* includes multiple second pixels 110*pb*. The multiple second pixels 110*pb* are arranged along the α-direction. The multiple second pixels 110*pb*, for example, emit green light. The third pixel column 110*prc* includes multiple third pixels 110*pc*. The multiple third pixels 110*pc* are arranged along the α-direction. The multiple third pixels 110*pc*, for example, emit blue light. The substrate is not illustrated in FIG. 9B. For example, similar to the display device 110 shown in FIGS. 5A and 5B, the display device 410*a* includes the multiple first pixels 110*pa*, the multiple second pixels 110*pb*, and the multiple third pixels 110*pc* on a substrate.

The first pixel 110*pa*, the second pixel 110*pb*, and the third pixel 110*pc* have configurations similar to that of the pixel 710*p* shown in FIG. 6B. For example, the semiconductor stacked body 712*a* emits ultraviolet light. In the first pixel 110*pa*, the ultraviolet light is incident on a wavelength conversion member, and the wavelength conversion member converts the ultraviolet light into red (a first color) light and emits the light. In the second pixel 110*pb*, the ultraviolet light is incident on a wavelength conversion member, and the wavelength conversion member converts the ultraviolet light into green (a second color) light and emits the light. In the third pixel 110$pc$, the ultraviolet light is incident on a wavelength conversion member, and the wavelength conversion member converts the ultraviolet light into blue (third color) light and emits the light. The first pixel, the second pixel, and the third pixel are not limited to the configurations described above and can have appropriate configurations as long as light of different colors, favorably red, green, and blue, can be emitted.

By appropriately setting the cycle length of the light emitted by the display device 410$a$ and the rotational speed of the movable optical system 140, the display device 410$a$ and the movable optical system 140 sequentially emit the light toward the output element 123 to form one image. The output element 123 sequentially reflects the incident light, and the reflected light forms the first image IM1.

A system similar to that of the display control system 1400 described with reference to FIG. 2 is applicable to the cycle length of the light emitted by the display device 410 and the rotational speed of the movable optical system 140. An image that corresponds to the first and second images IM1 and IM2 is reproduced by the color mixing of the pixels of the first pixel column 110$pra$, the second pixel column 110$prb$, and the third pixel column 110$prc$. Therefore, since there are cases where the upper end and lower end of the reproduced image do not include the colors of all of the pixels, for example, it is favorable for the display control system to perform processing to pre-remove the upper end and lower end of the image, etc.

Effects of the modification will now be described.

The image display device according to the modification provides the following effects in addition to effects similar to those of the image display device 10 according to the first embodiment. Namely, the display device 410$a$ includes pixel columns that include pixels emitting light of different colors; therefore, the light source device that includes the display device 410$a$ can reproduce a color image, and the first image IM1 and the second image IM2 can be displayed in color. It goes without saying that a high-definition color image can be reproduced by arranging two or more pixel columns with shifted pixel pitches for one color as in the example shown in FIG. 9A.

Fourth Embodiment

Figure 10:
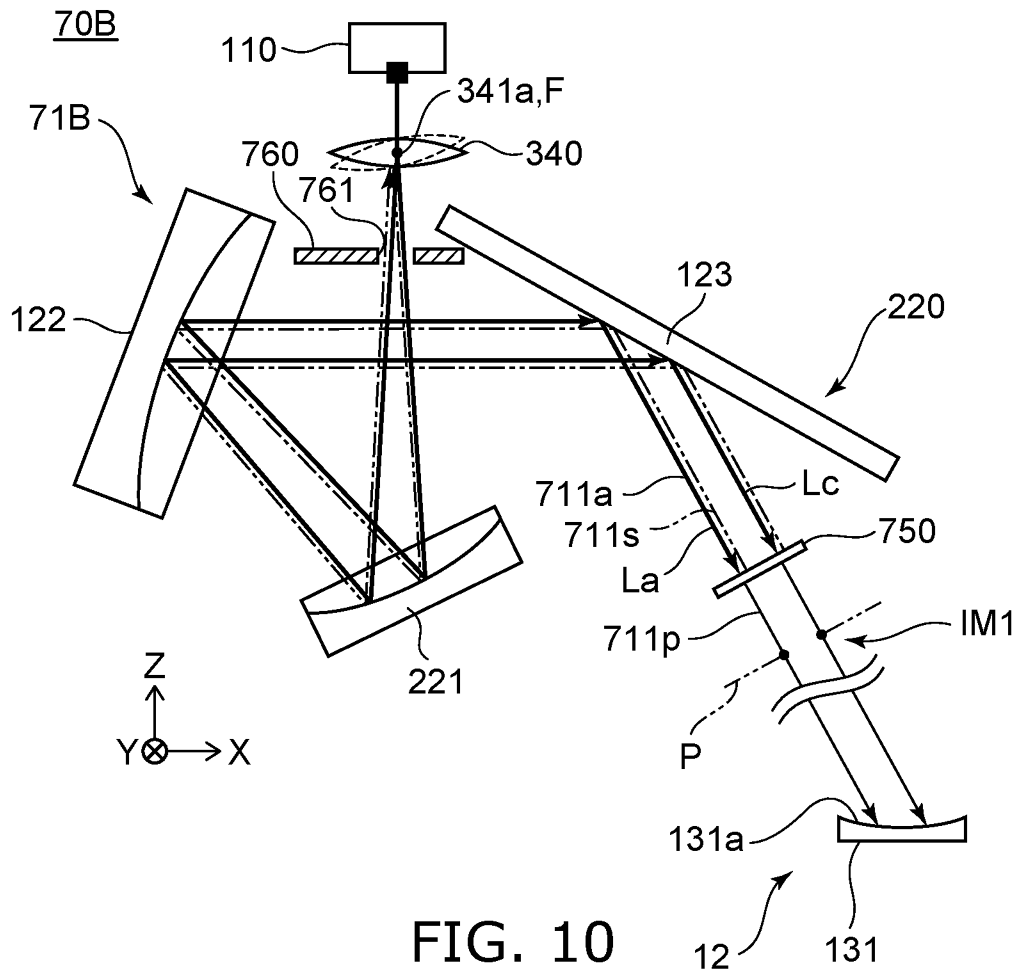
FIG. 10 is a schematic side view illustrating a light source unit according to a fourth embodiment.

FIG. 10 is a schematic side view illustrating an image display device according to a fourth embodiment.

As shown in FIG. 10, the image display device 70B according to the embodiment includes a light source unit 71B and the reflection unit 12. The image display device 70B according to the embodiment differs from the image display device 20 according to the second embodiment in that the light source unit 71B is included. Otherwise, the configuration of the image display device 70B according to the embodiment is the same as the configuration of the image display device 20 shown in FIG. 7; the same components are marked with the same reference numerals, and a detailed description is omitted as appropriate.

The light source unit 71B includes the display device 110, the imaging optical system 220, a reflective polarizing element 750, and a light-shielding member 760. According to the embodiment, the light source unit 71B differs from the light source unit 21 shown in FIG. 7 in that the reflective polarizing element 750 and the light-shielding member 760 are further included. In FIG. 10, the light-shielding member 760 is shown in cross section, and the other components are shown in end view. Although the two chief rays La and Lc are shown in FIG. 10 to avoid complexity of illustration, the relationship between the chief rays and the light emitted by the display device 110 is similar to those of the example shown in FIG. 1 and the example shown in FIG. 7.

The reflective polarizing element 750 is located at a position of the optical path between the display device 110 and the reflection unit 12 at which the chief rays La and Lc are substantially parallel to each other. In the example of FIG. 10, the chief rays La and Lc are substantially parallel to each other in the optical path between the intermediate element 122 and the reflection unit 12, and the reflective polarizing element 750 is located between the output element 123 and the reflection unit 12.

The reflective polarizing element 750 transmits a first polarized light 711$p$, which is P-polarized light, and reflects a second polarized light 711$s$, which is S-polarized light, to return the second polarized light 711$s$ to the display device 110. Specifically, the display device 110 emits light 711$a$ that includes the first and second polarized light 711$p$ and 711$s$. The light 711$a$ travels via the input element 121 and the intermediate element 122 and then is incident on the reflective polarizing element 750. In FIG. 10, the optical path of the light 711$a$ including the first and second polarized light 711$p$ and 711$s$ is shown by thick solid-line arrows, the first polarized light 711$p$ is shown by thin solid-line arrows, and the second polarized light 711$s$ is shown by double dot-dash-line arrows. "P-polarized light" means light of which the oscillation direction of the electric field is substantially parallel to the incident plane of the reflective polarizing element 750. "S-polarized light" means light of which the oscillation direction of the electric field is substantially perpendicular to the incident plane of the reflective polarizing element 750.

The reflective polarizing element 750 transmits the greater part of the first polarized light 711$p$ included in the light 711$a$. The greater part of the first polarized light 711$p$ transmitted by the reflective polarizing element 750 travels via the output element 123 and then is emitted from the reflection unit 12.

The reflective polarizing element 750 reflects the greater part of the second polarized light 711$s$ included in the light 711$a$ and returns the greater part of the second polarized light 711$s$ along the optical path from the display device 110 to the reflective polarizing element 750. Specifically, the reflective polarizing element 750 has a flat plate shape. The reflective polarizing element 750 is arranged to be substantially orthogonal to the chief rays. The reflective polarizing element 750 specularly reflects the greater part of the second polarized light 711$s$. Therefore, the greater part of the second polarized light 711$s$ reflected by the reflective polarizing element 750 travels via the intermediate element 122 and the input element 121 in this order and then returns to the display device 110.

For example, by using the display device 710 shown in FIG. 6B, a portion of the second polarized light 711$s$ returning in the display device 710 along the path described above is scattered by the wavelength conversion member 715 of the display device 710 and converted into the first polarized light 711$p$. Because the light that is converted into the first polarized light 711$p$ is re-emitted from the display device 710, an effect of increasing the ratio of the first polarized light 711$p$ included in the light 711$a$ emitted by the display device 710 can be expected. The user 14 more easily views the second image IM2 because the first image IM1 and the second image IM2 are formed by the light 711$a$ having a high ratio of the first polarized light 711$p$.

For example, a wire-grid reflective polarizing element that uses multiple metal nanowires can be used as the reflective polarizing element 750.

As long as the reflective polarizing element 750 is at a position at which the chief rays La and Lc are substantially parallel, the reflective polarizing element 750 is not limited to being between the output element 123 and the reflection unit 12 and may be located between the intermediate element 122 and the output element 123.

The light-shielding member 760 is located at the vicinity of the movable optical system 340, which is located at the vicinity of the focal point F, and the light-shielding member 760 is located at the light emission side of the movable optical system 340. For example, the light-shielding member 760 has a flat plate shape substantially parallel to the XY-plane. An aperture 761 that extends through the light-shielding member 760 in the Z-direction is provided in the light-shielding member 760. That is, the aperture 761 is positioned at the vicinity of the focal point F of the imaging optical system 120.

The light that is emitted from the display device 110 and passes through the focal point F and the vicinity of the focal point F passes through the aperture 761 of the light-shielding member 760 and is incident on the input element 121, and the greater part of the light other than such light is shielded by the light-shielding member 760. The second polarized light 711*s* that is reflected by the reflective polarizing element 750 and travels along the optical path, that is, passes through the focal point F and the vicinity of the focal point F, returns to the display device 110 by passing through the aperture 761 of the light-shielding member 760. On the other hand, the greater part of the second polarized light 711*s* reflected by the reflective polarizing element 750 and traveling toward the display device 110 but not along the optical path is shielded by the light-shielding member 760.

Effects of the image display device according to the embodiment will now be described.

The image display device 70B according to the embodiment includes the light source unit 71B. The light source unit 71B includes the reflective polarizing element 750, and the reflective polarizing element 750 is located at a position at which the chief rays La and Lc are substantially parallel. The reflective polarizing element 750 transmits the first polarized light 711*p* of the light emitted from the display device 110 and reflects the second polarized light 711*s* of the light emitted from the display device 110. Therefore, the luminance of the second image IM2 can be increased because the ratio of the first polarized light 711*p* included in the light emitted from the light source unit 71B can be increased.

The light source unit 71B according to the embodiment includes the light-shielding member 760, and the light-shielding member 760 is located at the vicinity of the movable optical system 340. Because the movable optical system 340 is located at the position of the focal point F of the light source unit 71B, the light-shielding member 760 can transmit the light along the optical path and shield ineffective light that is not along the optical path. As a result, stray light due to ineffective light can be suppressed, and when light from the outside penetrates the light source unit 71B, the light can be prevented from traveling toward the display device 110, etc., and the temperature rise of the display device 110 can be suppressed.

Although the light source unit includes both the reflective polarizing element 750 and the light-shielding member 760 in the example of FIG. 10, the light source unit may include one of the two, and may provide the effects of each component.

Fifth Embodiment

Figure 11:
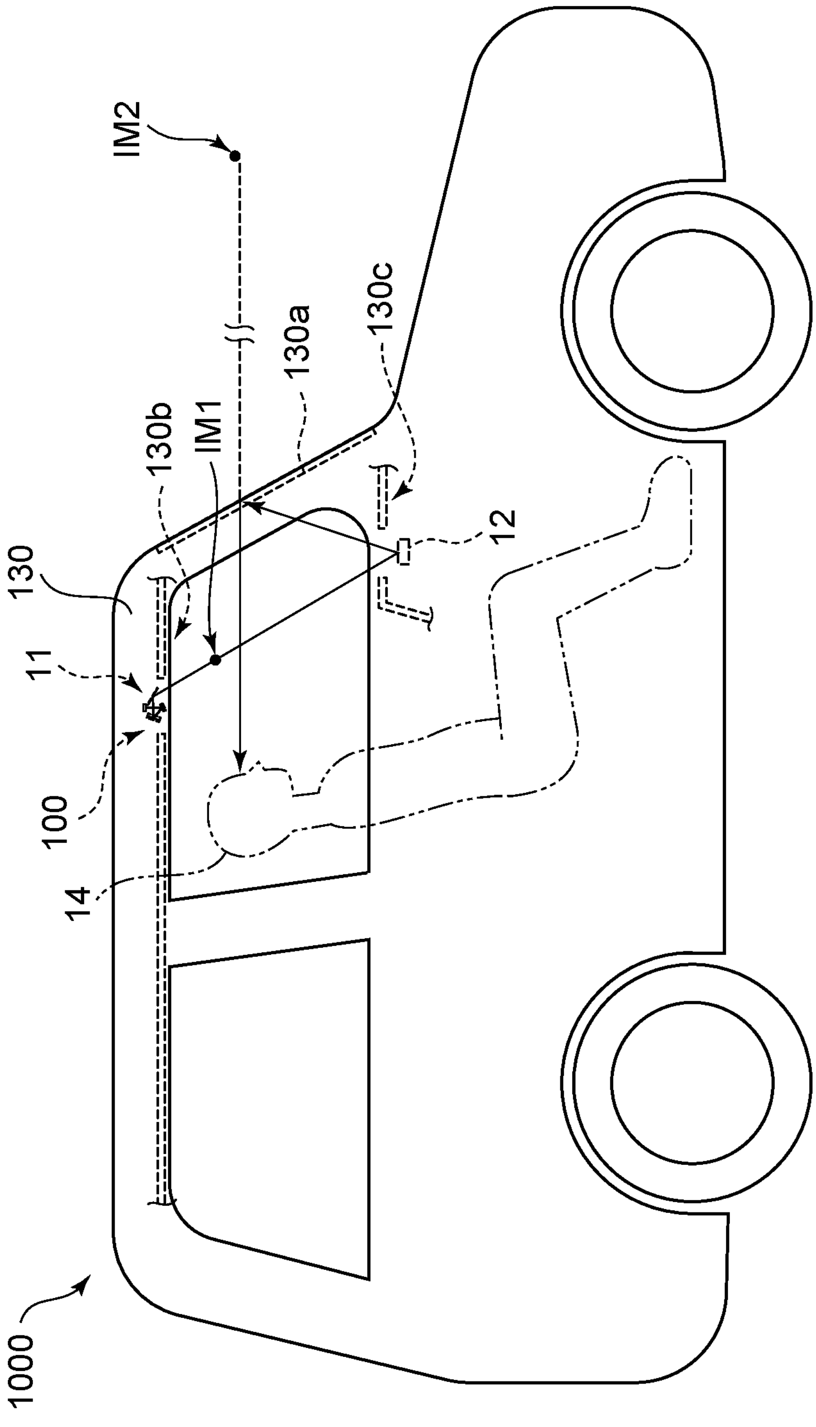
FIG. 11 is a schematic side view showing a vehicle in which an image display device according to a fifth embodiment is mounted.

FIG. 11 is a side view showing a vehicle in which the image display device according to the embodiment is mounted.

The image display device 100 according to the embodiment can be mounted in the vehicle 130 and used as a HUD. In other words, an automobile 1000 according to the embodiment includes the vehicle 130 and the image display device 100. The image display device 100 is fixed to the vehicle 130. This is similar for other embodiments as well. The light source unit 11 of the image display device 100 is located at a ceiling part 130*b* of the vehicle 130. The reflection unit 12 of the image display device 100 is located at a dashboard part 130*c* of the vehicle 130.

The light source unit 11 that is located at the ceiling part 130*b* forms the first image IM1 between the light source unit 11 and the reflection unit 12. The reflection unit 12 reflects the light emitted from the light source unit 11. The greater part of the light reflected by the reflection unit 12 is reflected by the inner surface of a front windshield 130*a* and enters the eyebox of the user 14. As a result, the user 14 can view the second image IM2. The light source unit 11 also can be configured to have a continuous body with a rearview mirror unit (not illustrated), etc.

The configurations of the multiple embodiments and multiple modifications described above can be appropriately combined to the extent of feasibility.

As described above, the arrangement of the light source unit and the reflection unit 12 can be set freely as long as the first image IM1 can be formed between the light source unit and the reflection unit 12, and the light emitted from the reflection unit 12 can be irradiated on the reflecting surfaces such as the inner surface of the front windshield 13*a*, etc.

What is claimed is:

1. A light source unit comprising:

a display device configured to emit light having a substantially Lambertian light distribution, the display device comprising a pixel column, the pixel column comprising a plurality of pixels arranged along a first direction; and an imaging optical system comprising:

a bending part comprising a movable optical system on which light emitted from the display device is incident, the movable optical system being movable around an axis parallel to the first direction, the movable optical system emitting light at an angle corresponding to a movement state, and a direction modifying part comprising an output element on which light is incident via the movable optical system, light emitted from the output element forming a first image, wherein:

the imaging optical system is substantially telecentric at a first image side, the bending part is configured to bend chief rays of light emitted at different angles from the movable optical system so that the chief rays are substantially parallel to each other before and after the first image, and the direction modifying part is configured to modify a travel direction of the chief rays so that the chief rays traveling via the bending part are directed toward a formation position of the first image.

2. The light source unit according to claim 1, wherein: the movable optical system comprises a reflective mirror.

3. The light source unit according to claim 1, wherein: the movable optical system comprises a polygon mirror.

4. The light source unit according to claim 1, wherein: the movable optical system comprises a lens.

5. The light source unit according to claim 1, wherein: the display device comprises a plurality of the pixel columns arranged along a second direction crossing the first direction.

6. The light source unit according to claim 5, wherein: the plurality of the pixel columns comprise:
a first pixel column comprising a plurality of first pixels, and
a second pixel column comprising a plurality of second pixels, the second pixel column being located adjacent to the first pixel column in the second direction;
a first pixel pitch between pixels of the plurality of first pixels is equal to a second pixel pitch between pixels of the plurality of second pixels;
a length along the first direction between a center of one of the first pixels among the plurality of first pixels and a center of one of the second pixels among the plurality of second pixels is greater than 0; and
the one of the second pixels is located adjacent to the one of the first pixels.

7. The light source unit according to claim 5, wherein: the plurality of the pixel columns comprise:
a first pixel column comprising a plurality of first pixels configured to emit light of a first color,
a second pixel column located adjacent to the first pixel column in the second direction, the second pixel column comprising a plurality of second pixels configured to emit light of a second color; and
a third pixel column located adjacent to the second pixel column in the second direction, the third pixel column comprising a plurality of third pixels configured to emit light of a third color.

8. The light source unit according to claim 1, wherein: the display device is configured to emit light having a light distribution pattern in which a luminous intensity in a direction of an angle θ with respect to an optical axis of the light emitted from the display device is approximated by $\cos^n \theta$ times a luminous intensity at the optical axis, and
n is a value greater than 0.

9. The light source unit according to claim 8, wherein: n is not more than 11.

10. The light source unit according to claim 1, wherein: each of the plurality of pixels comprises a LED element.

11. The light source unit according to claim 10, wherein: each of the plurality of LED elements is configured to emit light having a substantially Lambertian light distribution.

12. The light source unit according to claim 10, wherein: each of the plurality of pixels further comprises a wavelength conversion member located on the respective LED element.

13. The light source unit according to claim 1, further comprising:
a light-shielding member located between the display device and the imaging optical system; wherein:
the light-shielding member includes an aperture, a portion of light from the display device toward the imaging optical system passing through the aperture; and
another portion of the light from the display device toward the imaging optical system is shielded by the light-shielding member.

14. An image display device comprising:
the light source unit according to claim 1; and
a reflection unit separated from the light source unit, the reflection unit configured to reflect light emitted from the imaging optical system; wherein:
the first image is formed between the light source unit and the reflection unit.

15. The image display device according to claim 14, further comprising:
a reflective polarizing element located at a part of an optical path between the display device and the reflection unit; wherein:
chief rays of light emitted at different angles from the movable optical system are substantially parallel to each other as the chief rays pass through the first image at the part of the optical path;
the reflective polarizing element is configured to transmit a first polarized light of the light emitted from the display device; and
the reflective polarizing element is configured to reflect a second polarized light of the light emitted from the display device to return to the display device.

16. An automobile comprising the image display device according to claim 15 fixed to the automobile.

17. An automobile comprising the image display device according to claim 14 fixed to the automobile.

18. An image display device comprising:
a light source unit comprising:
a display device configured to emit light having a substantially Lambertian light distribution, the display device comprising a pixel column, the pixel column comprising a plurality of pixels arranged along a first direction, and
an imaging optical system comprising:
a movable optical system on which light emitted from the display device is incident, the movable optical system being movable around an axis parallel to the first direction, the movable optical system emitting light at an angle corresponding to a movement state, and
a first mirror on which light is incident via the movable optical system;
a reflection unit separated from the light source unit and comprising a second mirror configured to reflect light emitted from the imaging optical system; and
a windshield on which light is incident via the second mirror; wherein:
the first mirror is configured to output light that forms a first image in an open space between the first mirror and the second mirror; and
the light emitted from the first mirror is substantially telecentric in an entirety of the open space between the first mirror and the second mirror.

19. The image display device according to claim 18, further comprising:
a reflective polarizing element located at a part of an optical path between the display device and the reflection unit; wherein:
chief rays of light emitted at different angles from the movable optical system are substantially parallel to each other as the chief rays pass through the first image at the part of the optical path;
the reflective polarizing element is configured to transmit a first polarized light of the light emitted from the display device; and
the reflective polarizing element is configured to reflect a second polarized light of the light emitted from the display device to return to the display device.

20. An automobile comprising the image display device according to claim 18 fixed to the automobile.

* * * * *